United States Patent
Nevarez

(10) Patent No.: US 6,471,054 B2
(45) Date of Patent: Oct. 29, 2002

(54) SOFT-SIDED SPORTS BAG FOR CARRYING OUTDOOR SPORTS AND ACTIVITIES ACCESSORIES

(75) Inventor: Richard J. Nevarez, 12808 Joelle Rd. NE., Albuquerque, NM (US) 87112

(73) Assignee: Richard J. Nevarez, Albuquerque, NM (US)

( * ) Notice: Subject to any disclaimer, the term of this patent is extended or adjusted under 35 U.S.C. 154(b) by 0 days.

(21) Appl. No.: 09/734,485

(22) Filed: Dec. 11, 2000

(65) Prior Publication Data

US 2002/0104768 A1 Aug. 8, 2002

(51) Int. Cl.⁷ .............................................. B65D 85/00
(52) U.S. Cl. .................. 206/315.11; 206/579
(58) Field of Search ............................ 206/38, 315.11, 206/570, 579; 190/102, 109, 108, 115

(56) References Cited

U.S. PATENT DOCUMENTS

| | | |
|---|---|---|
| 2,065,234 A | 12/1936 | Martinez |
| 2,540,340 A | 2/1951 | Linblade |
| 2,691,400 A | 10/1954 | Giordano |
| 4,301,898 A | 11/1981 | Plough et al. |
| 4,691,469 A | 9/1987 | Alsobrook et al. |
| 5,052,555 A | 10/1991 | Harmon |
| 5,207,303 A * | 5/1993 | Oswalt et al. ............... 190/108 |
| 5,228,547 A * | 7/1993 | Yoo ............................ 190/103 |
| 5,431,265 A * | 7/1995 | Yoo ............................ 190/103 |
| 5,950,352 A | 9/1999 | Volmer |
| 6,250,470 B1 * | 6/2001 | Mackenzie ................... 190/109 |

* cited by examiner

Primary Examiner—David T. Fidei

(57) ABSTRACT

Presented is a soft-sided sports case for carrying tools, accessories and equipment used in outdoor sports such as fly-fishing, hunting, hiking, and photography. The soft-sided sports case constitutes a main receptacle having a belt with fasteners and a strap belt with a loop which are used to attach the main receptacle to pants, shoulder straps, belts, or bulky items. Inside the main receptacle are removable inserts. The inserts are constructed to appeal to the needs of different outdoor sports enthusiasts. For fly fishermen there is a foam insert whereby flies and lures are attached to foam rubber. For the hunter there is an elastic insert, whereby ammunition is slipped under elastic strips and secured onto the insert. In addition to the interchangeable, removable, replaceable inserts are a system of internal pockets, a net zipper pouch, elastic strips, and an external tote bag. The internal pocket system, net zipper pouch, elastic strips, and tote bag allow the sports enthusiast additional storage space for a water bottle tools, and other accessories used in their sport.

16 Claims, 19 Drawing Sheets

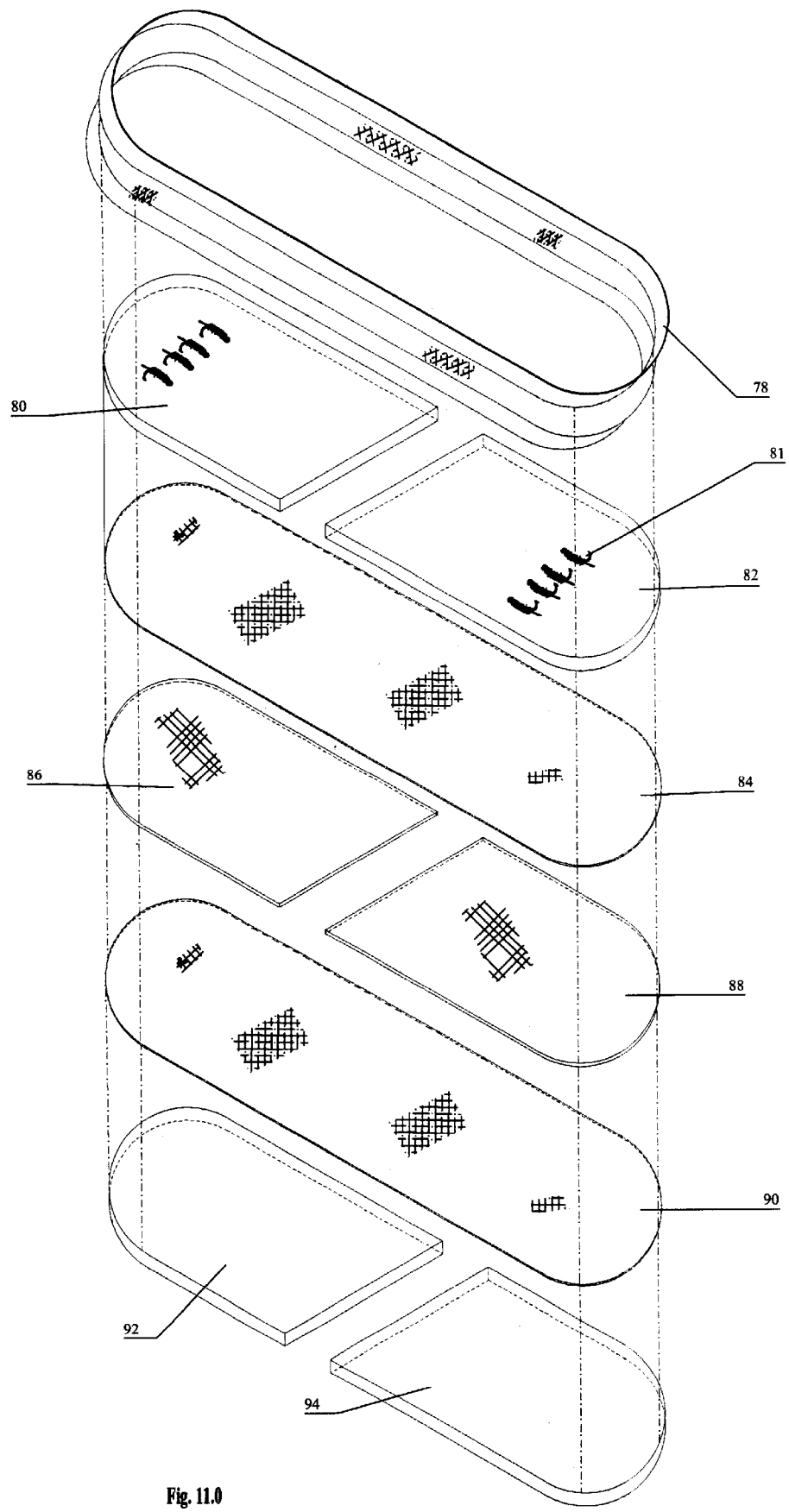
Fig. 11.0

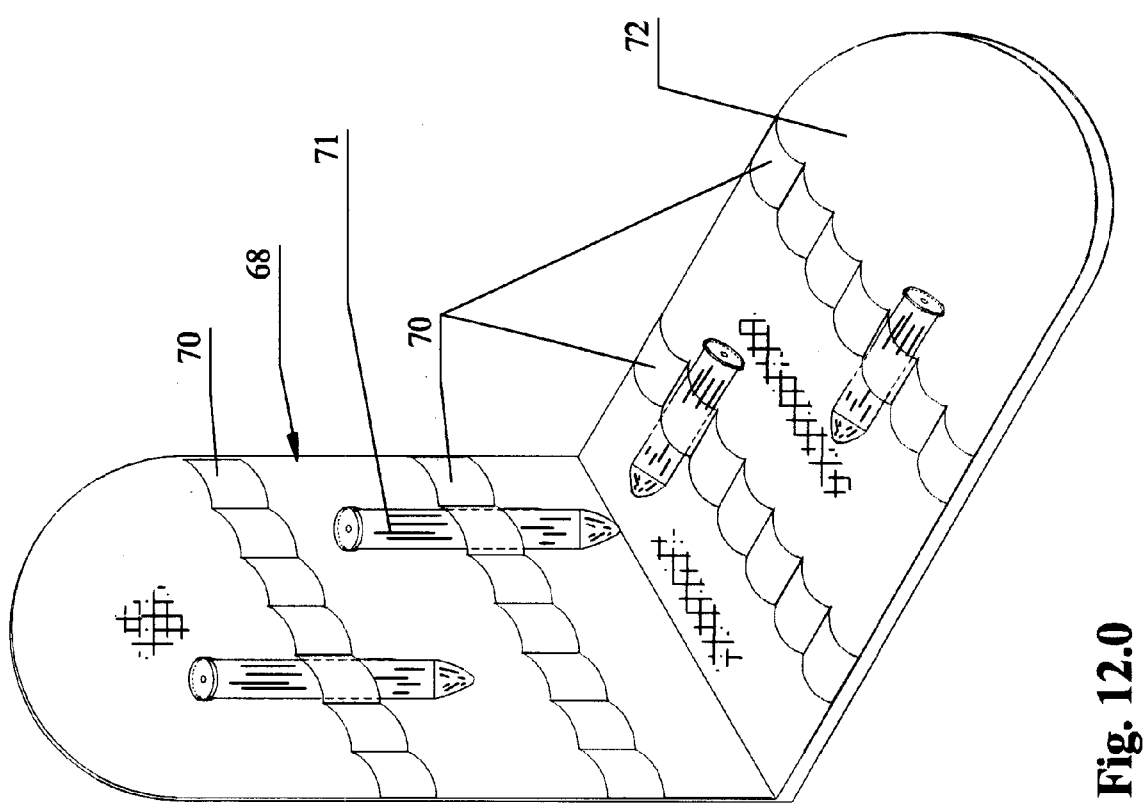
Fig. 12.0

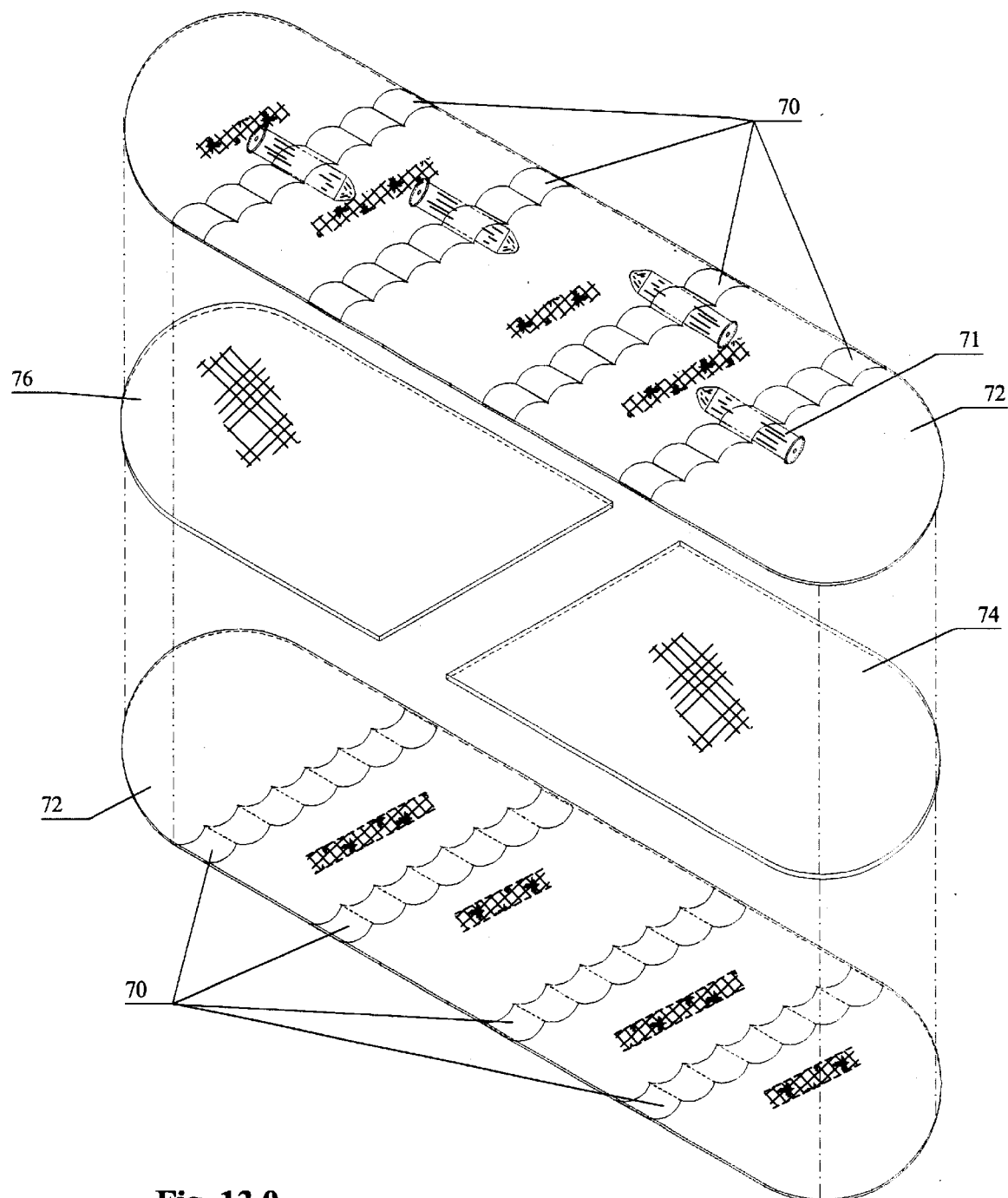
Fig. 13.0

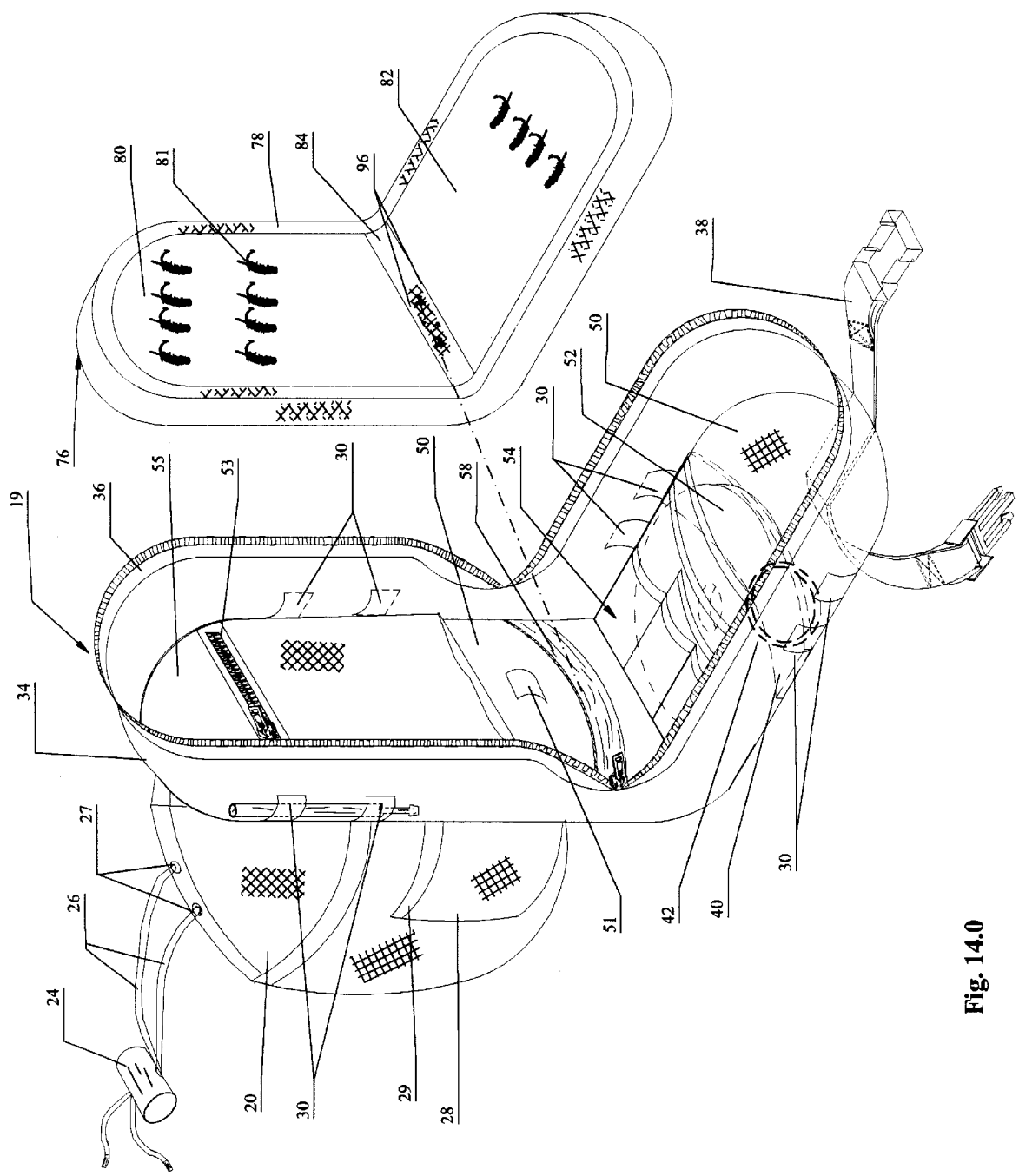
Fig. 14.0

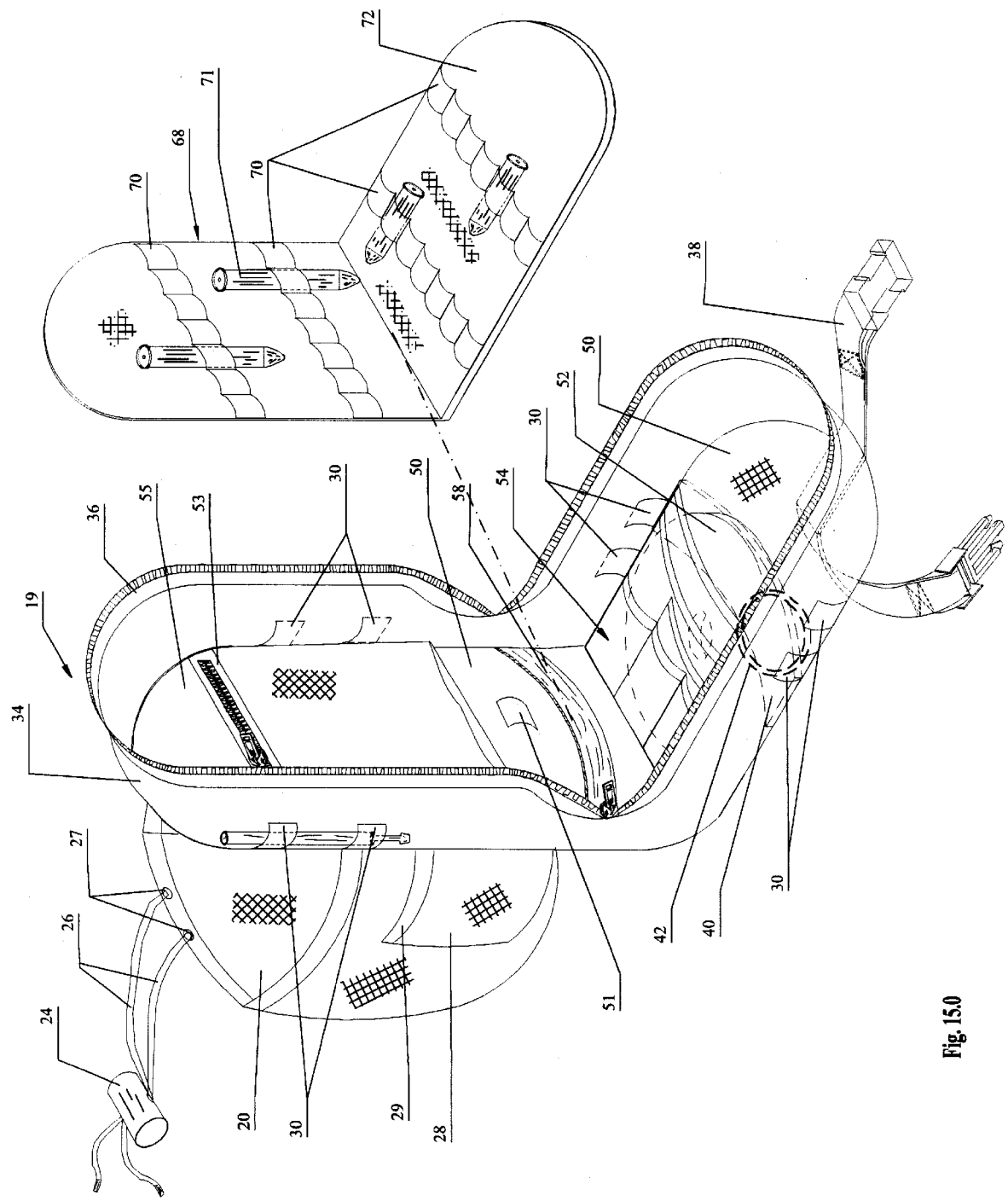
Fig. 15.0

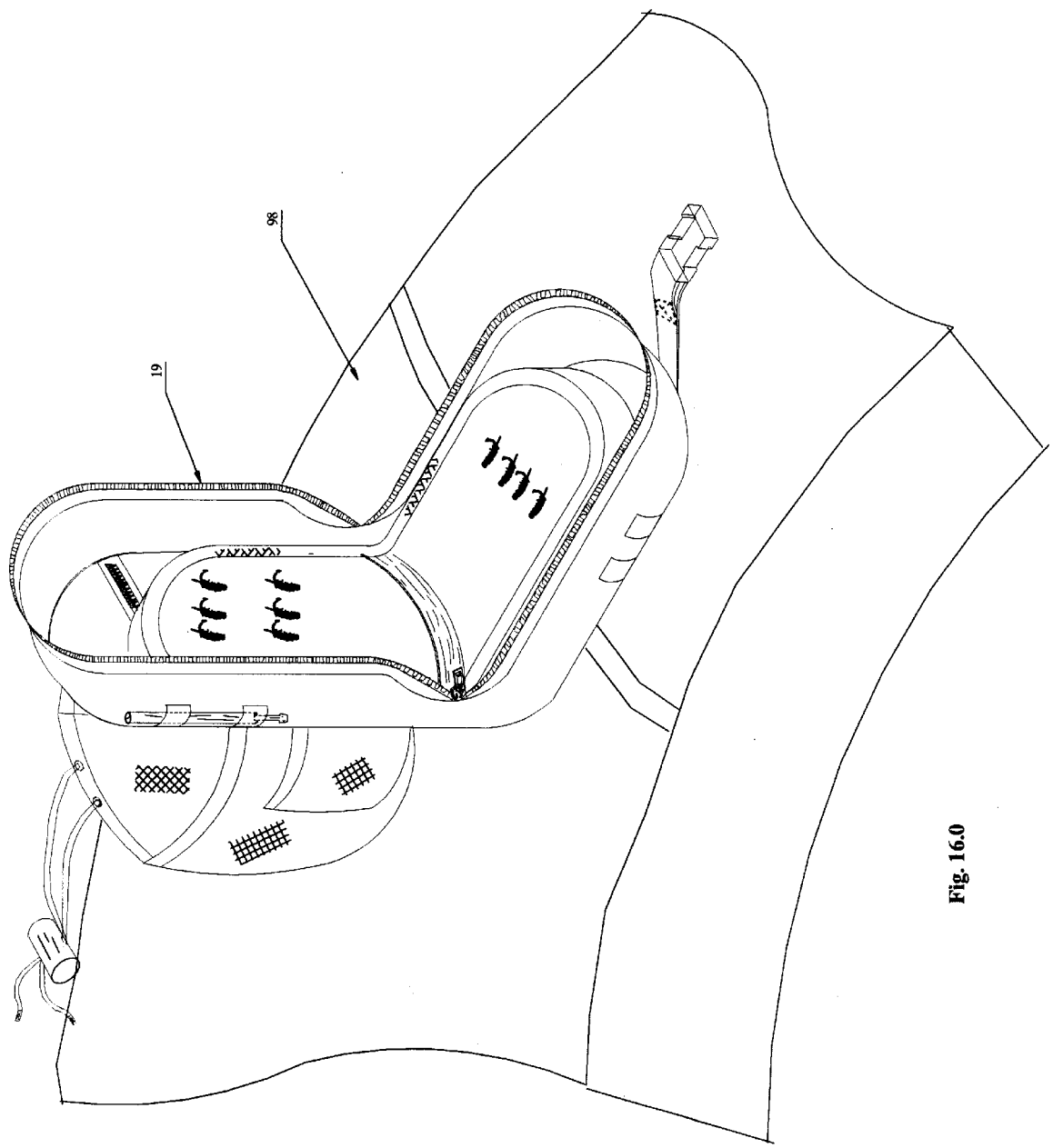
Fig. 16.0

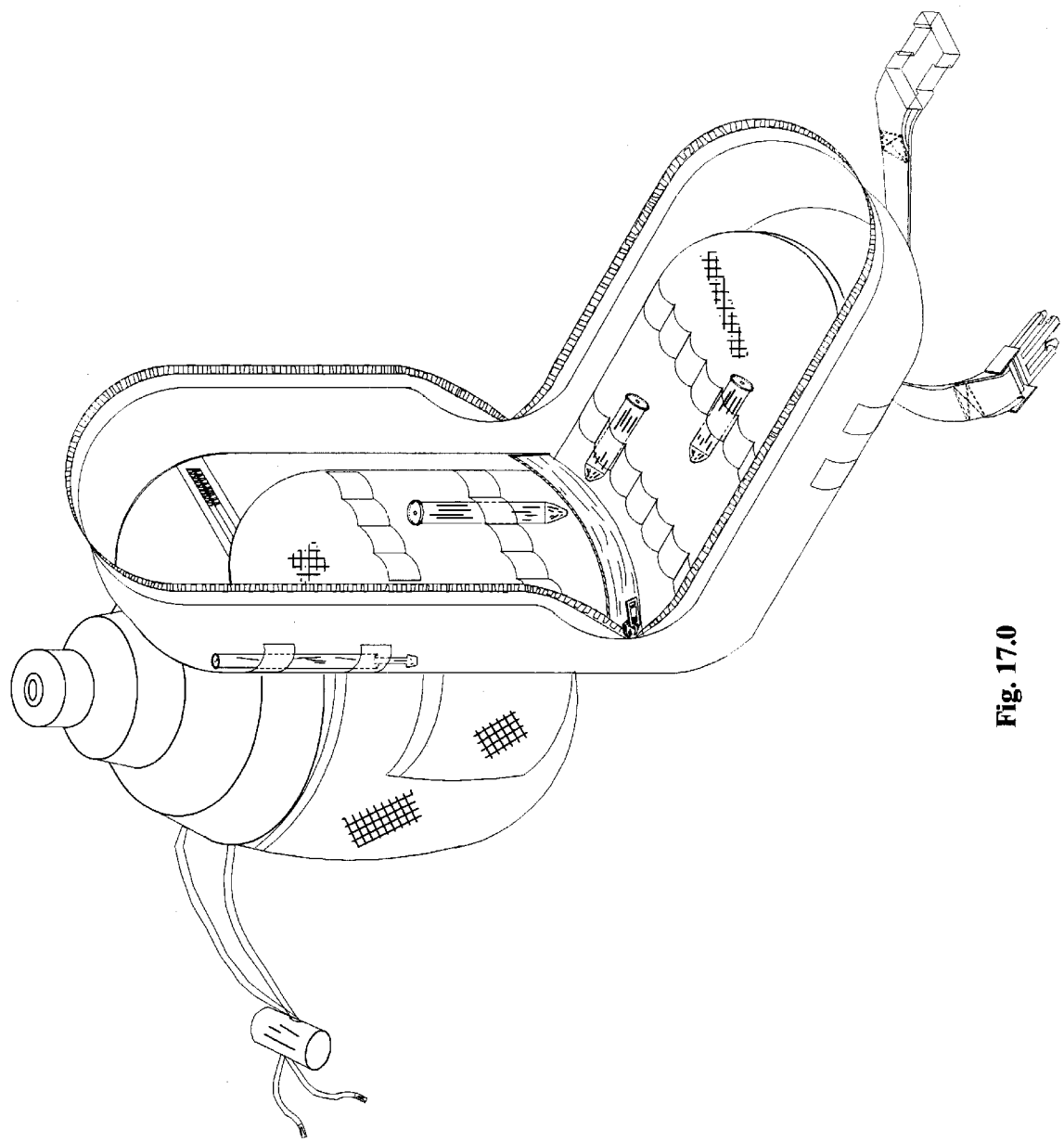
Fig. 17.0

SOFT-SIDED SPORTS BAG FOR CARRYING OUTDOOR SPORTS AND ACTIVITIES ACCESSORIES

CROSS-REFERENCE TO RELATED APPLICATIONS

U.S. Pat. No. 2,065,234, December 1936, Martinez, 206/315.11 X

U.S. Pat. No. 2,540,340, February 1951, Linblade, 206/315.11 X

U.S. Pat. No. 2,691,400, October 1954, Giordano, 206/315.11 X

U.S. Pat. No. 4,691,469, September 1987, Alsobrook et al., 383/37 X

U.S. Pat. No. 5,052,555, October 1991, Harmon, 206/315

U.S. Pat. No. 5,950,352, September 1999, Volmer

U.S. Pat. No. 4,301,898, November 1981, Plough et al., 206/315.11

BACKGROUND—Field of Invention

This invention relates to an outdoor sports and activities accessory carrying cases, specifically such cases used to carry fishing lures, fishing flies, shelled ammunition, film, tools, plastic containers and other objects used in outdoor sports and activities such as photography, hiking, fishing and hunting.

BACKGROUND—Description of Prior Art

Among the many people who love to hunt and fish, the most dedicated to these two sports are those whom venture out far beyond to remote locates. The fly-fisherman, the most dedicated of land fishermen, will venture out to locate unpopulated, unpolluted streams to enjoy their sport. This raises a challenge that he might not have the proper fly, or equipment for the particular stream, and thus may need to carry a variety of flies to appeal to the fish. The hunter, as well will also venture out far beyond to remote locations to locate wild gave in remote unpopulated areas. Their challenge is to minimize the amount of weight carried, while making full utilization of the equipment being used to carry additional weight. The hiker and photographer likewise seek solitude, and travel large distances into remote areas to enjoy what awaits them in solitude. The subject matter of this invention is in part a response to the more widespread travel undertaken from such sportsmen, and the increase popularity of those wishing to enjoy the outdoors. In particular, for fly-fishing and hunting, the traditional or conventional storage devices for carrying fly fishing equipment, flies and ammunition are largely inadequate.

Heretofore, most travel or storage systems used by fly-fishermen were of two types: 1) the hard-case fly carrying box and 2) some soft sided wallets. Both of which require the use of a fly fisherman vest, or other pocket carrying devices or accessories for the fly-fisherman to have to carry them within.

The hard-case fly carrying box are formed of either aluminum or plastic and either utilize small compartments in which the individual flies are placed, or materials such as foam rubber, sheep skin, aluminum ridges, or magnetic sheets in which the flies are inserted into. This system has inherent drawbacks: other necessary tools are not able to be carried within these boxes, compartments are not always large enough to accommodate all sized flies or tools, the use of these boxes requires the use of other carrying devices such as backpacks and vests in which these boxes are placed into, accessibility to the fly is inconvenient and requires the fly-fisherman to open the carrying device, remove the box, open the box, and then finally select a fly. Because some of these carrying boxes utilize materials such as sheepskin or foam rubber, which are attached to the inner shell, in time the materials wore down and thus make the storage container unusable. Recently there have been some commercial attempts at assembling a soft-pack fly carrying bags and tackle bags. These have generally been either binder type arrangements comprised of a few loose-leaf polyethelene zip-lock bags together with a few general purpose slip or patch pockets sewn into the front and back of the soft-pack binder or large zipper pouches which either use waist straps, or hang off the shoulders of the fly fisherman. These are inadequate in that they are bulky, make the accessibility to the flies a multi-step process as does a fly fishing vest and yet still require the use of traditional hard-case and soft-case fly boxes.

Heretofore, most travel or storage systems used by hunters to carry ammunition were of four types: 1) soft-sided pouches, 2) ammunition belts, 3) elastic strips which sewn to patches which attach to the butts of the rifles, and 4) hunting vests with elastic strips. The soft-sided pouches are generally fabric with a zipper which provides a enclosure for ammunition to be placed within. The ammunition is simply placed into these pouches and usually not secured. This method of storage is inadequate in that it does not allow for the ammunition to be secure, and thus as the hunter transverses across the hunting area, the ammunition juggles and rattles, making unnecessary noise. Furthermore, the storage capacity is limited and does not support the carrying of other necessary hunting equipment such as binoculars, water bottles, and snacks. Those devices which are comprised of material strips sewn onto material, and either slipped onto the butt of the rifle, or wrapped around the waists are inadequate as they do not offer additional storage space for other hunting equipment, and often result in the dropping of and losing of ammunition while the hunter is in pursuit of the game. Hunting vests are bulky and awkward in use for those hunters who travel large distances.

A preliminary patentability and novelty search conducted in connection with the subject matter of my invention revealed the existence of U.S. Pat. Nos. 2,065,234; 2,540,340; 2,691,400; 4,691,469; 5,052,555; 5,950,352; and 4,301,898. An examination of the patents identified will reveal that each is only utilized for the sport of fishing and not interchangeable with other sporting activities such as hunting, hiking, fishing and photography. An examination of the first two patents listed above (U.S. Pat. Nos. 2,065,234 and 2,540,340) will reveal that each relates to a container for carrying completed flies, and more specifically completed flies in traditional fly boxes. None of the structures depicted above can be utilized in the absence of traditional fly carrying boxes or containers. Additionally, none of the structures depicted in these first two patents have any structural correspondence to the subject matter of my invention.

U.S. Pat. No. 2,691,400 relates to a fisherman's utility bag, which may be put to many different uses. While it may be use to carry fly-tying tools, materials, equipment, as any duffel bag may, its intended design is for carrying fishing tackle in completed form. Additionally, it does not offer as an alternative to the use of traditional fly boxes. Furthermore, there is considerable structural difference between this patented structure and my invention.

U.S. Pat. No. 4,691,469 relates to a fishing tackle management system designed specifically to hold fishing tackle, and does not allow for the replacement of interchangeable foam and elastic inserts, and is bulky. Additionally, the fishing tackle management system can only accommodate fishing equipment and is not interchangeable with other sports activities. Furthermore, there is considerable structural difference between this patented structure and my invention.

U.S. Pat. No. 5,052,555 relates to a tote bag for fly-tying equipment and materials designed specifically to hold fly tying materials and tackle for unfinished flies. Additionally, it does not allow for the carrying of finished flies and is bulky. Furthermore, there is considerable structural difference between this patented structure and my invention.

U.S. Pat. No. 5,950,352 identifies a system and method for carrying fishing equipment to the field by a person. This invention identifies a variety of fishing bags; equipment and tackle accessories which do not allow for easy accessibility to flies and lures and still make use of the traditional fly box concept. The invention does offer a fishing wallet, but the wallet uses velcro as the holding mechanism. Since the boxes are attached to the wallet using velcro in time the velcro will wear and require replacement. Furthermore, there is considerable structural differences between this patented structure and my invention.

U.S. Pat. No. 4,301,898 relates to a peace officer's equipment bag designed specifically to carry a variety of equipment used by peace officers as an alternative to gym bags or duffel bags. This invention is large and bulky for uses by hunters or sportsmen and was not intended to be used other than to assist peace officers transport their equipment over short distances. Furthermore, there is considerable structural differences between this patented structure and my invention.

SUMMARY

In terms of broad inclusion, the subject matter of my invention comprises a soft-sided sports bag or soft carrying case for carrying and organizing fishing lures, flies, ammunition, film, and other tools, accessories, and equipment that are used in outdoors sports such as fishing, fly-fishing, hunting, hiking and photography. In general the soft-sided sports bag includes one main section designed to secure either foam or elastic removable inserts and containing within the main section a zipper pouch and a pocket system for the storage of tools, equipment and accessories to accommodate the particular sport. The foam inserts are constructed by attaching sections of foam rubber to the outer layers of fabric material, sandwiched between the fabric material are flexible plastic sheets. The foam inserts may be used to secure items such as hooks and needles in the sports of fishing and fly-fishing. The elastic inserts are constructed by attaching long sections of elastic material across the wide sections of the elastic inserts to outer layers-composed of fabric material, sandwiched between the fabric material are flexible plastic sheets. The soft-sided sports bag also includes an outer tote bag, which is attached exterior to the main outer shell. The tote bag is used to provide additional storage for fishing spools, bait, tools, accessories, a water bottle, binoculars, and other sports equipment. The soft-sided sports bag is opened and closed using a perimeter-zipper panel. The exterior of the soft-sided sports bag is provided with two belts, which are attached to the exterior side opposite that of which the tote bag is attached. The first belt is attached at its ends to the outer shell of the soft-sided sports bag, a plastic attachment loop is slide onto the first belt and may be used to secure the soft-sided sports bag to bulky items such as a float tubes. The second belt is attached to the near the curved end of the soft-sided sports bag. The second belt has a plastic belt fastener attached to the ends so that the fastener is opened and closed to attach the soft-sided sports bag around smaller objects such as shoulder straps, belt loops, and belts. Additional, exterior to the soft-sided sports bag, and secured to the zipper panel are several sets of elastic material strips which provide for easy storage and access to tools and accessories.

Objects and Advantages

Fly-fishing is undergoing a creative revolution at the present time, resulting in the availability of new fishing accessories, tools, leaders, and even flies. The modern fly fisherman now carries many new accessories and tools that have not previously existed. Increased knowledge about feeding habits of fish and the life-cycles of insects have created a demand for a versatile portable accessory pack which can accommodate both accessories and flies for fishing such as my invention. Additionally, the sports of hunting and hiking have also undergone a significant revolution resulting in the need to enable sportsmen to carry objects such as bullets, camera film, snacks, tools, and sports glasses in a compact manner.

Accordingly, one of the important objects of my invention is the provision of a light weight, compact soft-pack tote bag for carrying fly tools, flies, sports accessories, ammunition and even a water bottle in an organized and easily accessible manner.

Another important object of my invention is the versatility it offers among outdoor sports enthusiasts. With the removable, interchangeable inserts, this invention can carry flies, ammunition, and camera film individually, or in combination.

A still further object of the invention is the provision of a tote bag that presents an well-organized system that provides equal visibility and equal access to all tools and accessories.

The invention possesses other objects and features of value, some of which along with the foregoing will be apparent from the description and the drawings. Additional objects and features of value are listed as follows: a) floats; b) provides interchangeable inserts; c) provides replaceable inserts; d) is light in weight; e) can attach small items such as pant loops, waders, etc.; f) is water-resistant; g) easy to access interior stored objects; h) small in size; i) can attach to larger items such as a float tube, and backpack; j) can be produced in a variety of colors without requiring the manufacturer to use a different production facility, or methods; k) provides a substitute for the traditional hard case and soft-case fly fishing box and fishing vest and bag combinations; l) offers an affordable alternative to other types of sports carrying cases; m) for ammunition provides safer storage by separating and restraining shells; n) is durable in construction; o) with the interchangeable inserts, it can be used during different seasons of the year; p) is compatible with existing sportswear; q) is easily transported for distribution; r) is composed of available fabrics and materials.

Further objects and advantages are to provide a carrying case, which can be used easily and conveniently to access and retrieve stored objects. This object is simple to use and inexpensive to manufacture and can be supplied with or without different inserts for a particular sport, offering versatility for the manner in which it may be used. Still further objects and advantages will become apparent from a consideration of the following description and drawings.

BRIEF DESCRIPTION OF THE DRAWINGS

FIG. 11 is an exploded isometric view of the foam insert showing the various material layers.

FIG. 12 is an isometric view of the elastic insert, shown with a bullet.

FIG. 13 is an exploded isometric view of the elastic insert showing the various material layers.

FIG. 14 is an isometric view of the soft-sided sports bag with the foam insert.

FIG. 15 is an isometric view of the soft-sided sports bag with the elastic insert.

FIG. 16 a view of the soft-sided sports bag configured for use with a float tube, with the foam insert in place.

FIG. 17 is a view of the soft-sided sports bag configured for use in carrying ammunition which is inserted onto the elastic inserts, and a water bottle inserted into the outer tote bag.

Reference Numerals: In Drawings

| | |
|---|---|
| 19 Soft-sided sports bag | 28 Exterior pocket (s) |
| 20 Outer tote bag | 29 Edge strip |
| 24 Draw string barrel | 30 Elastic strip (s) |
| 26 Draw string (s) | 32 Outershell |
| 27 Eyelets | 34 Zipper panel |
| 36 Zipper | 68 Elastic Insert |
| 38 Belt | 70 Elastic Strip |
| 40 Belt Strap | 71 Ammunition |
| 42 Attachment loop | 72 Fabric panel |
| 44 Plastic end section sheet | 74 Plastic sheet |
| 46 Plastic mid section sheet | 75 Plastic sheet |
| 48 Plastic end section sheet | 76 Foam Insert |
| 50 Internal cover | 78 Edging strip |
| 51 Elastic Strip | 80 Foam rubber |
| 52 Leader spool | 81 Flies |
| 53 Zipper | 82 Foam rubber |
| 54 Pockets | 84 Fabric panel |
| 55 Pouch | 86 Plastic sheet |
| 56 Edging strips | 88 Plastic sheet |
| 58 Strap | 90 Fabric panel |
| 60 Small pockets | 92 Foam rubber |
| 62 Midsize pockets | 94 Foam rubber |
| 64 Large pockets | 96 Slip pockets |
| 66 Large pockets | 98 Float tube |

DESCRIPTION OF THE PREFERRED EMBODIMENT

Figure 1:
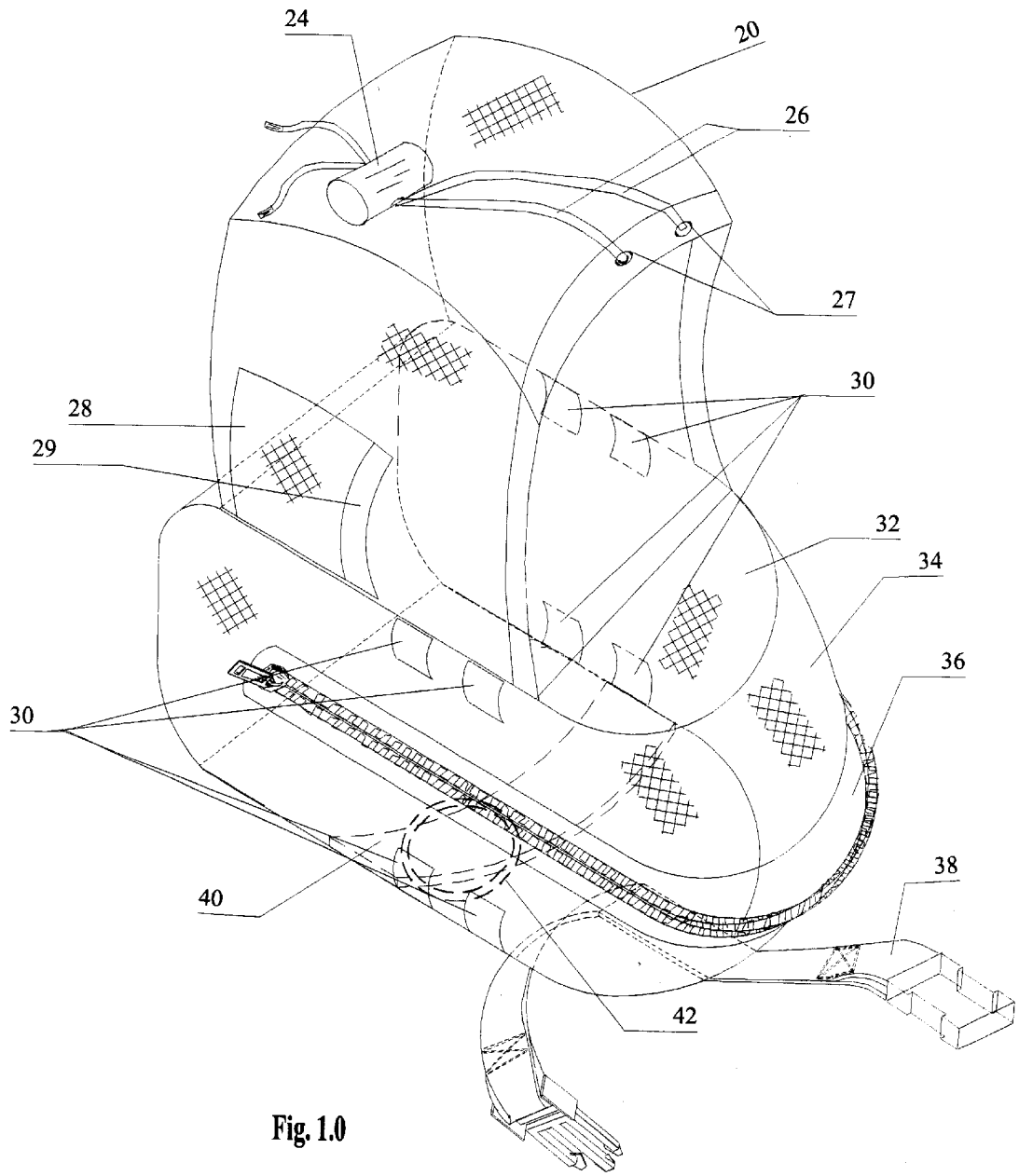
FIG. 1 is an isometric closed view of my soft-sided sports bag.

In terms of greater detail, the portable, compact, versatile soft-sided sports bag of my invention for use in connection with fishing, fly-fishing, hunting, hiking, photography, accessories, tools is shown in FIG. 1 in its closed condition for portability, and designated generally by the numeral 19. The material from which a outer shell 32 is formed is preferably a soft but strong and flexible woven fabric. As shown in FIG. 1 the outer shell 32 is sewn along the long edge ends to long edge ends of a zipper panel 34. The zipper panel 34 is formed of a strong, light, long flexible nylon fabric. A heavy-duty open-ended zipper 36 is attached lengthwise along the length of the edge end of the zipper panel 34, such that the zipper 36 bisects the zipper panel 34 to form the closed shell 32 as shown in FIG. 1. A plurality of small elastic strips 30, equal in dimension in width and length, and smaller in size than the width of the zipper panel 34, are sewn onto the zipper panel 34 to provide for easy placement tools and accessories for storage. These elastic strips 30 are placed both sides of the soft-sided sports bag 19 on the zipper panel 34. A outer tote bag 20 is sewn down the right, along the bottom and up the left side of the outer shell 32 and in between the outer shell 32 and the zipper panel 34. The open end of the outer tote bag 20 faces the curved line of the outer shell 32 as shown in FIG. 1. The material from which the outer tote bag 20 is formed is preferably a soft but strong, light and flexible nylon fabric. Two exterior pockets 28 are sewn to the outer tote bag 20 near the bottom and with a bottom corner of the exterior pocket 28 located at the intersection of the outer tote bag 20 and the outer shell 32. The two exterior pockets 28 are located at opposite sides of the outer tote bag 29 relative to each other. A edge strip 29 is sewn along the top side of the two exterior pockets 28 at the edge ends which form the tops of the exterior pockets 28. The exterior pockets 28 are formed of the same material that forms the outer tote bag 20. The edging strip 29 is formed of a soft but strong flexible woven fabric. Two eyelets 27 are attached into the upper edging of the outer tote bag 20 to allow the drawstrings 26 to be sewn into the connecting fabric ends of outer tote bag 20 and outer shell 32. A plastic drawstring barrel 24 is slide onto the drawstrings 26 to fasten the outer tote bag 20 in closed position.

Figure 2:
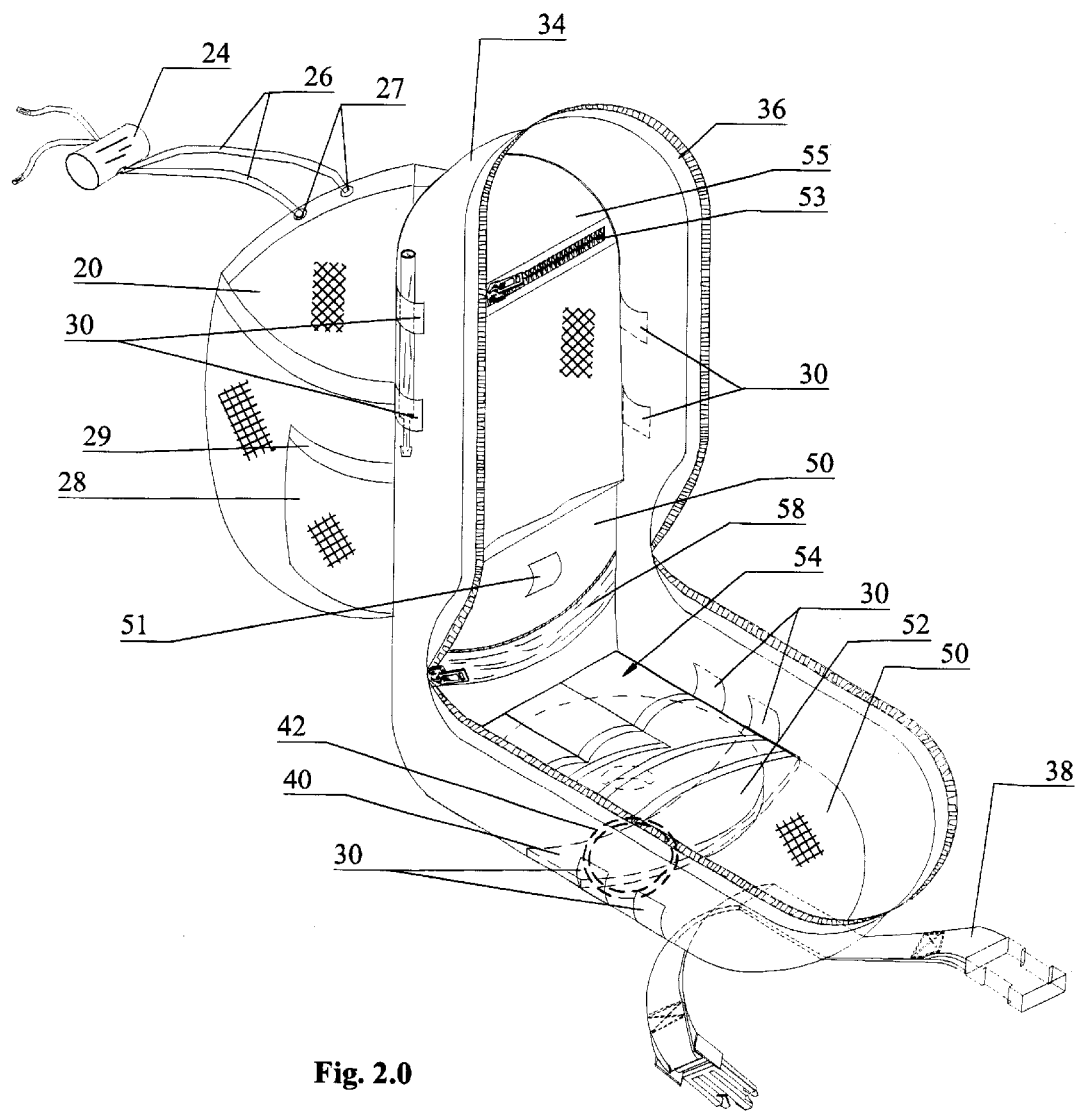
FIG. 2 is an isometric open view of the soft-sided sports bag without inserts.

Shown in FIG. 2, attached to the underside of the soft-sided sports bag 19 is a belt strap 40. The belt strap 40 is preferably formed of soft but strong and flexible woven material. An attachment loop 42 is slid onto the belt strap 40 before the short ends of the belt strap 40 are sandwiched in between the edges of the outer shell 32 and the internal cover 50 and sewn.

Figure 3:
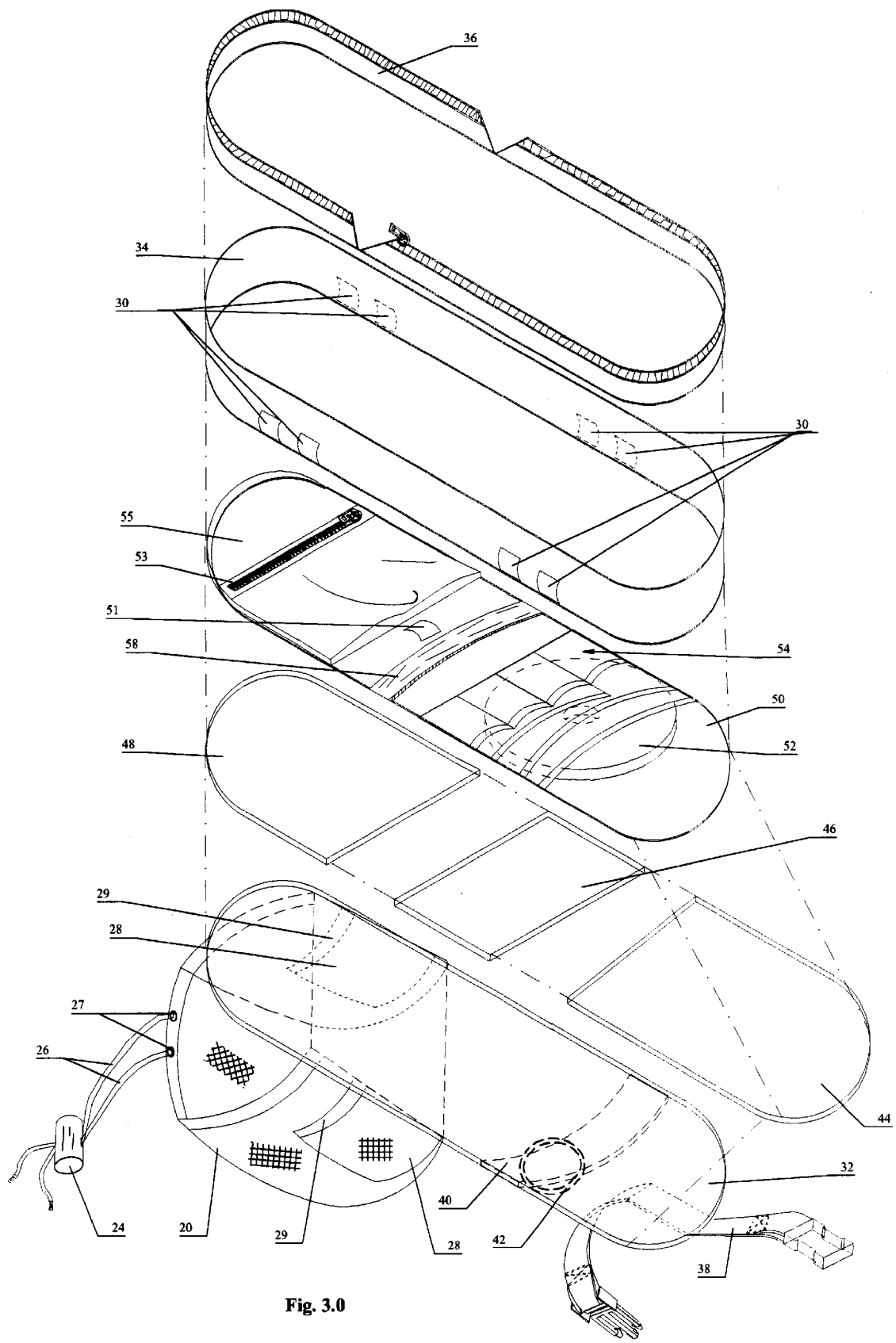
FIG. 3 is an exploded isometric view of the soft-sided sports bag showing the construction layers.

The interior construction of soft-sided sports bag 19 is shown in FIG. 2 and FIG. 3. Interior to soft-sided sports bag 19 is a pocket system 54, a zippered pouch 55, a strap 58, a elastic strip 51, and a internal cover as shown. A soft, strong, flexible nylon material is used to form the pocket system 54, and the lining for the internal cover 50. The elastic strip 51, is formed of a strip of stretchable elastic, which is equal in length and width. The strap 58 is formed of a soft, strong and flexible woven belt. The zippered pouch 55 is formed of a flexible netting material and is bisected by a zipper 53 to provide an enclosure for the storage of accessories. The foam insert 76 shown in FIGS. 14, and the elastic insert 68 shown in FIG. 15 will slide underneath the strap 58 allowing the sportsperson to exchange or remove the inserts for their particular needs. The construction of the interior of the soft-sided sports bag 19 is shown in FIG. 3 in an exploded isometric view. Attached to the wall of the outer shell 32 is a belt 38. The belt 38 is formed of standard snap and lock plastic fasteners with soft, strong nylon strapping material. The belt 38 is sewn at the middle and secured to the base of the soft-sided sports bag 19 located as shown in FIGS. 1, 2, 3, 14, and 15. The length of the belt 38 is such that the belt 38 can be wrapped and fastened around chest wader shoulder straps, backpacking frames, belt loops for pants, and other small items.

Again as shown in FIG. 3, a plastic end section 44 and plastic end section 48 and a plastic mid-section 46 are cut to size and layered between the internal cover 50 and the outer shell 32. The end section 44, end section 48 and the mid-section 46 are formed of thin flexible plastic sheets. The end section 44 and end section 48 are the same dimension in width and length. The width of the end section 44 and the end section 48 is approximately four inches. The total length of the end section 44 and end section 48 is approximately five and one half inches. The preferred embodiment shows the end sections 44 and 48 having three straight edges and a curved edge. The curvature of the ends of the end section 44 and the end section 48 are proportional to the width of the end sections 44 and 48 respectively, and configured such that the total combined lengths of the end section 44 and the end section 48 does not exceed the total overall length of the outer shell 32. The radius of the curvature of both end sections 44 and 48 are approximately two inches. The plastic mid-section 46, will serve as the spine to the soft-sided sports bag 19 is cut to approximately three inches in length and approximately four inches in width.

Referring still to FIG. 3, the soft-sided sports bag 19, the end section 44, the end section 48 and the mid section 46 are sandwiched between the outer shell 32 and the internal cover 50. Before sewing the adjoining end edges of the internal cover 50 and the outershell 32, the end edges of the pocket system 54, the shorter ends of the strap 58, the perimeter edges of the pouch 55, the ends of the zipper 36, and end edges of the zipper panel 34 are inserted between the outershell 32 and the internal cover 50. After inserting the end edges of the pocket system 54, the strap 58, the pouch 55, the zipper panel 34, and the ends of the zipper 36 between the outer shell 32 and internal cover 50 a long strong stitch is made around the outer perimeter of the outer shell 32 and internal cover 50. The zipper 36, is formed from a standard zipper structure, heavy duty open ended. The zipper 36 is sewn along the long end edges to the long end edges of the zipper panel 34. The ends of the zipper 36 are sandwiched between the internal cover 50 and the outer shell 32, preferably the zipper 36 ends are tucked and sewn at the middle of the spine which is the middle of the mid section plastic sheet 46. Shown in FIG. 3 the elastic strips, eight pieces of stretchable elastic cut into equal length and width and sewn onto the exterior wall of the zipper panel 34 to provide for the storage of small tools and accessories.

Figure 4:
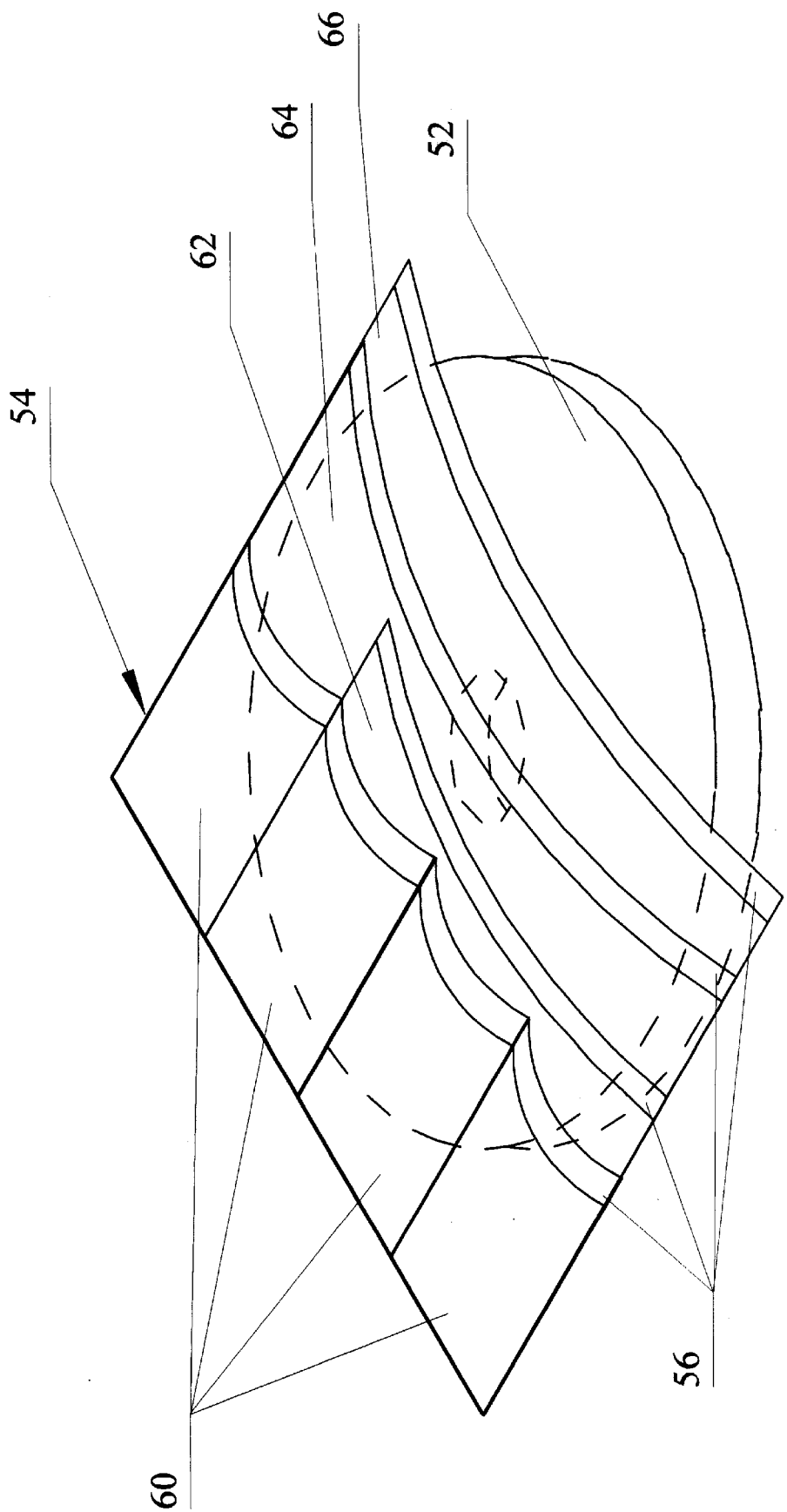
FIG. 4 is an isometric view of the internal pocket system, with a small leader spool inserted.
Figure 5:
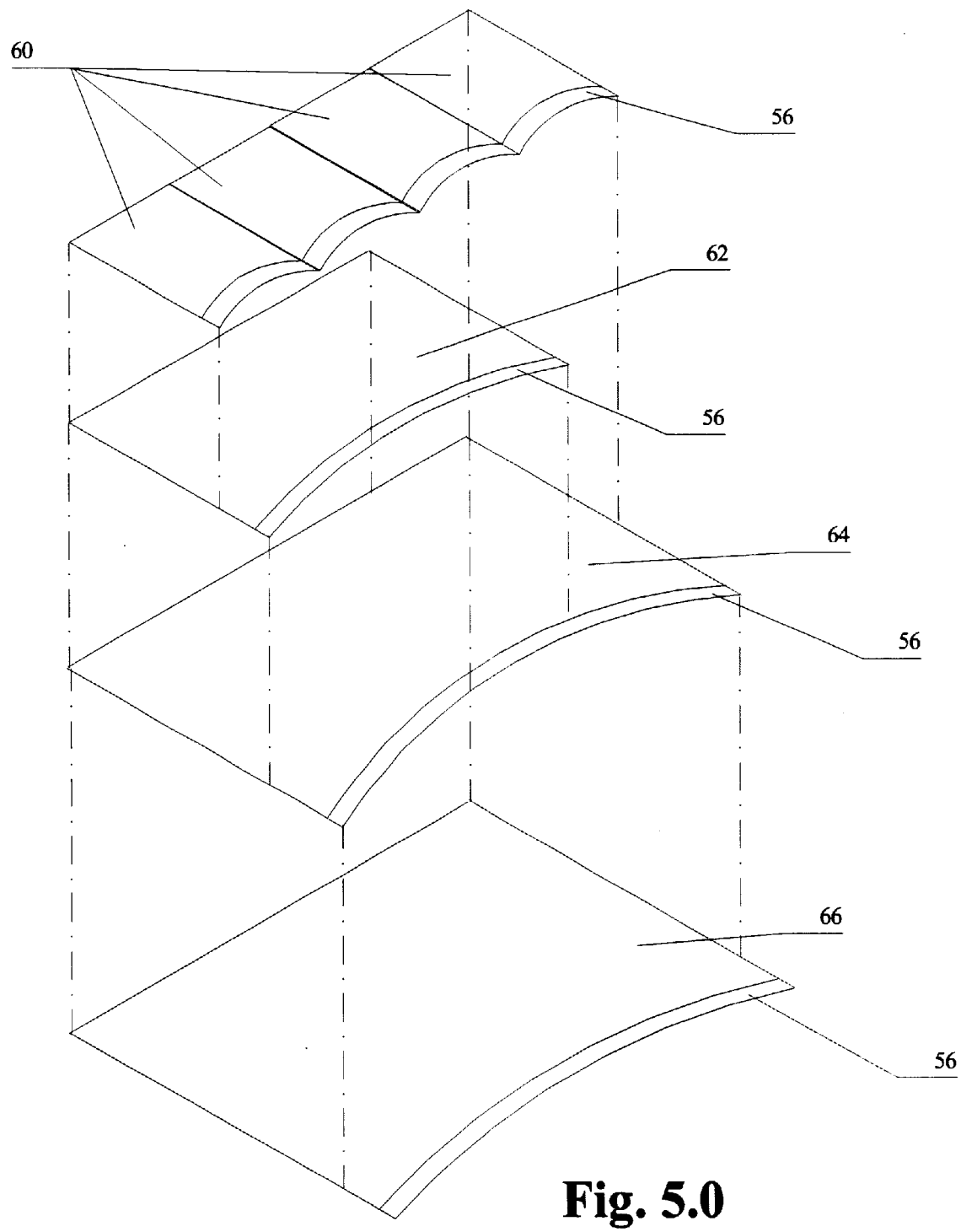
FIG. 5 is an exploded isometric view of the internal pocket system.
Figure 6:
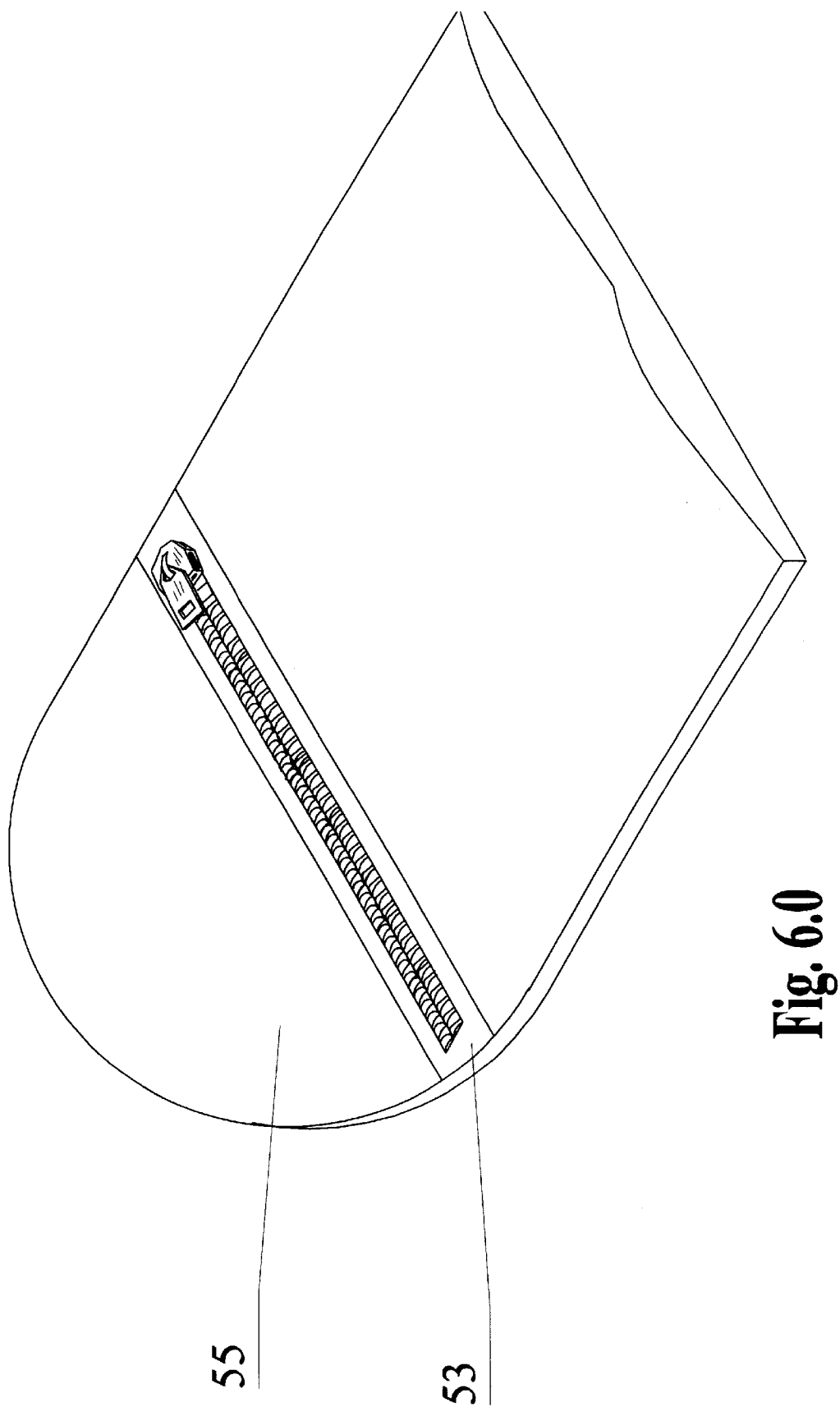
FIG. 6 is an isometric view of the internal zipper pouch.
Figure 7:
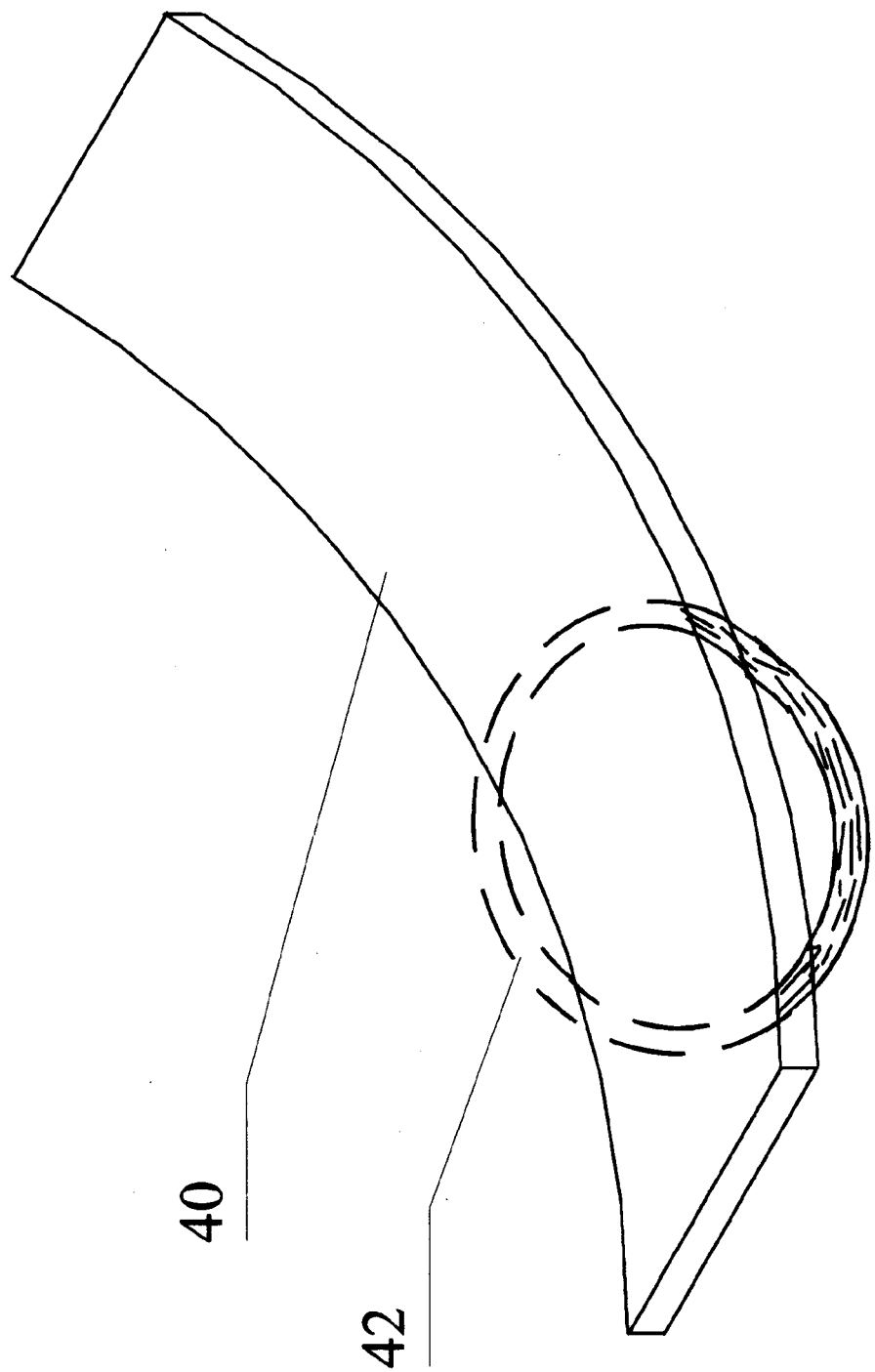
FIG. 7 is an isometric view of the belt strap and attachment loop, which is attached underneath of the soft-sided sports bag.
Figure 8:
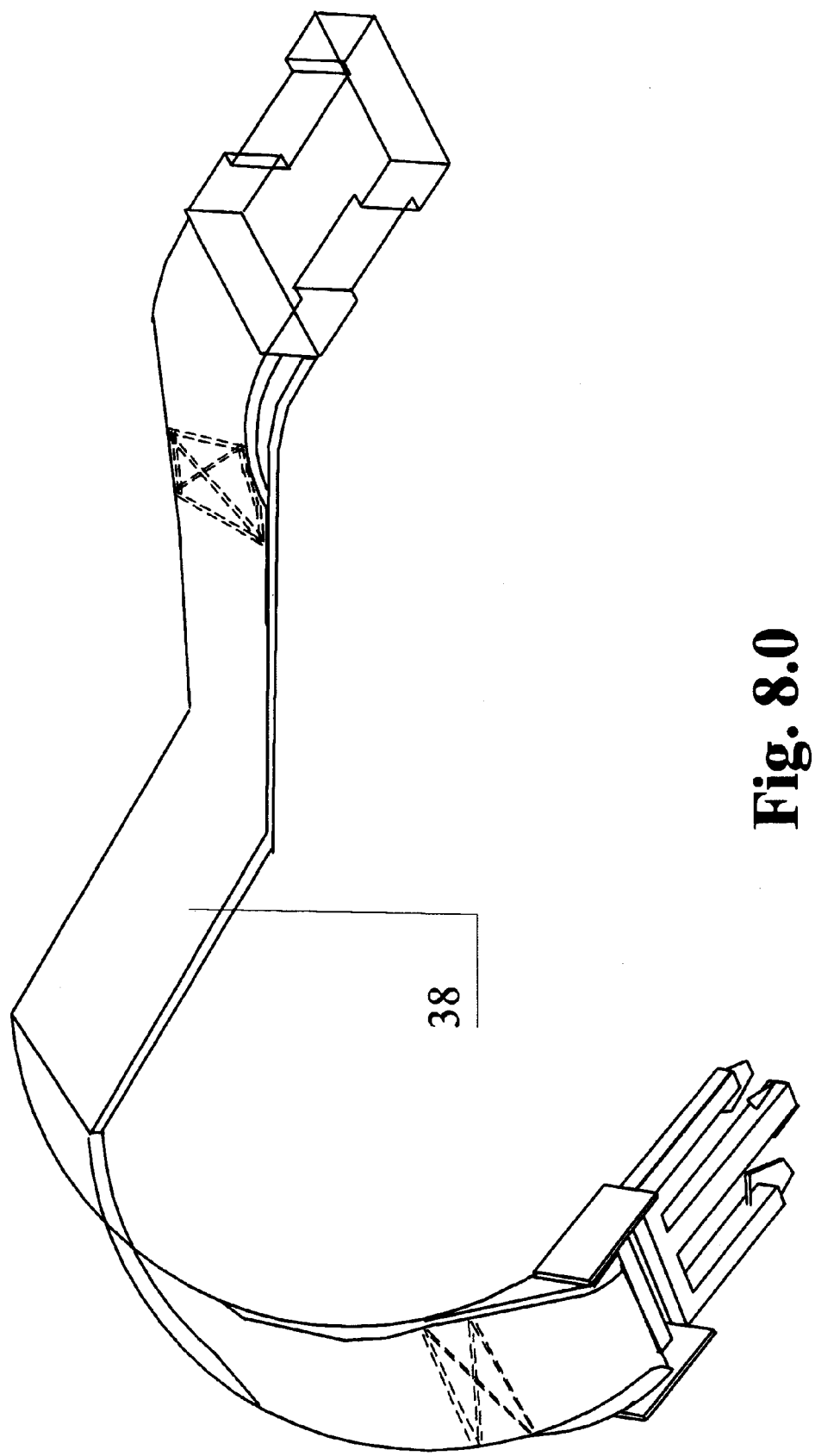
FIG. 8 is an isometric view of the belt, which is attached underneath of the soft-sided sports bag.
Figure 9:
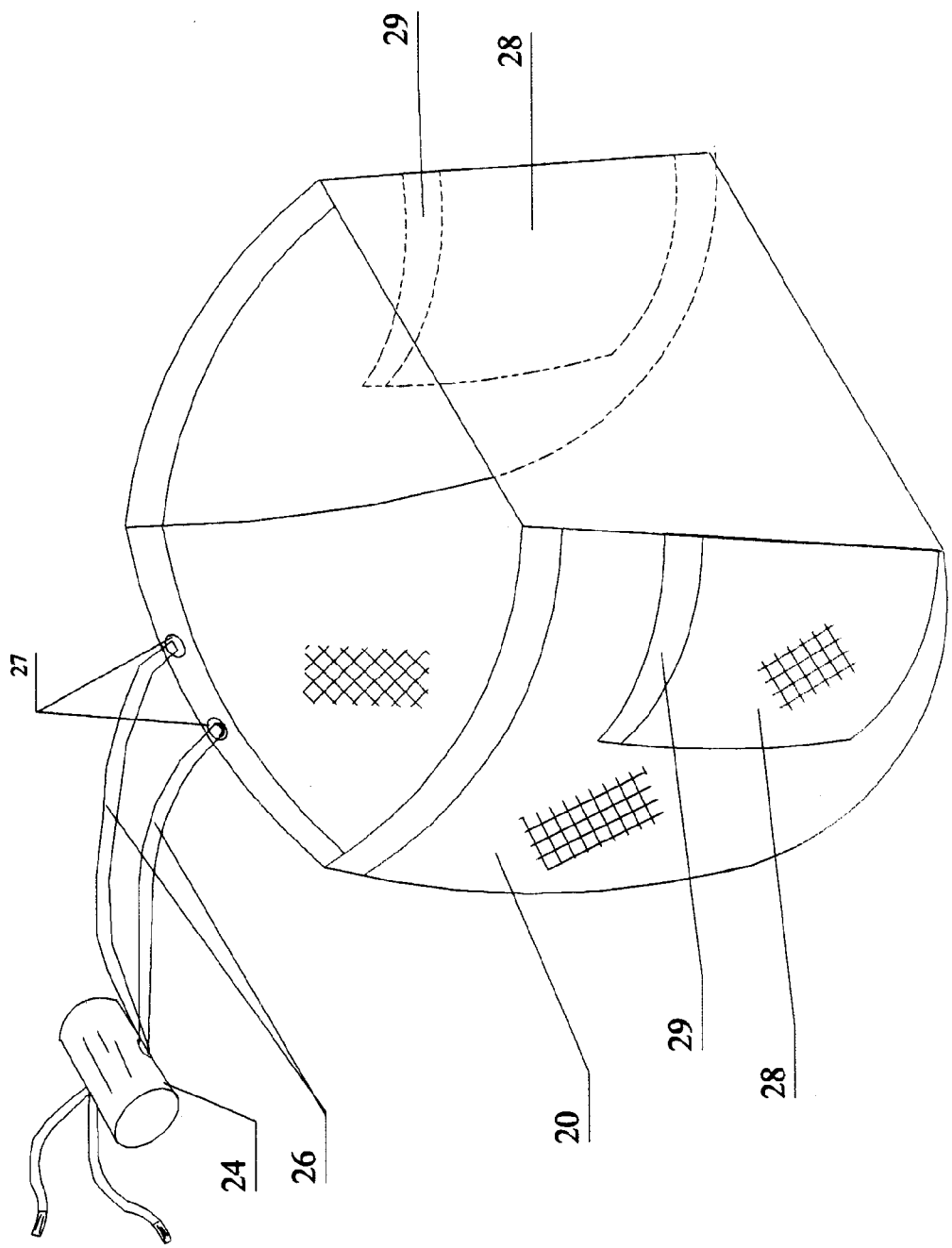
FIG. 9 is an isometric view of the outer tote bag.

Construction of the internal pocket system 54 is shown in FIG. 4 and 5. FIG. 4 identifies the completed construction, FIG. 5 identifies an exploded view of the pocket system 54. The pocket system 54 is formed of a soft, flexible, strong nylon material, the edging strips 56 are formed by a soft, flexible, strong, nylon or cotton material. The open ends of the pockets provided by the pocket system 54 face the curved section of the internal cover 50. The widths of the large pocket 64 and the large pocket 66 and the small pockets 60 are adapted to provide for adequate storage of smaller items. The length of the large pocket 66 is sized to extend from the near end of the spine to the beginning of the curved end of the internal cover 50. The large pocket 64 is sized to be at least one quarter of an inch shorter in length than the larger pocket 66. The mid size pocket 62 is sized to be at least one quarter of an inch shorter in length than the larger pocket 64. The small pockets 60 are sized to be at least one quarter of an inch shorter in length than the mid sized pocket 62. To give the small pocket 60, mid-sized pocket 62, larger pocket 64, and larger pocket 66 a finished appearance, edging strips 56 are sized and sewn at the open ends of the small pocket 60, mid-sized pocket 62, larger pocket 64, and larger pocket 66.

To form the pocket system 54, the mid sized pockets 62 is placed underneath the small pocket 60. Two small pockets 60 are formed by sewing a plurality of stitches lengthwise onto the wall of the mid sized pocket 62, with the stitch lines spaced approximately one inch apart. The stitch line which creates the third small pocket of the pocket 60 should be located at the far end of the midsize pocket 62. The assembled pockets 60 and 62 are overlaid onto the large pocket 64. A stitch line is made to adjoin the far end of the midsize pocket 62 and the far end of the stitch of the small pocket 60 onto the large pocket 64. The assembled small pocket 60, mid-sized pocket 62, and large pocket 64 are then overlaid onto of the large pocket 66. Both the near ends and the far ends of the small pocket 60, large pocket 64, and large pocket 66 are tucked between the outer shell 32 and the inner cover 50 and a stitch line along the near ends and far ends of the pocket system 54.

The pouch 55 is formed of a flexible woven netting material, which is lightweight, flexible, durable, so that objects internal to the pouch 55 are visible. The pouch 55 is sized to conform to the width and curvature of the internal cover 50, as shown in FIG. 2 and FIG. 3. The zipper structure 53 is a standard zipper with a closed end and 3 inches in length. The zipper structure 53 is sewn onto the pouch 55 using standard seamstress practices. The long near end edge, the straight end edge, the long opposite end edge and the curved end edge of the pouch 55 are sandwiched in between the internal cover 50 and the outer shell 32 and swen along the perimeter of the outer shell 32. The bottom of the pouch 55 is secured by sewing it to the internal cover 50 at the near end edge of the formed spine.

Figure 10:
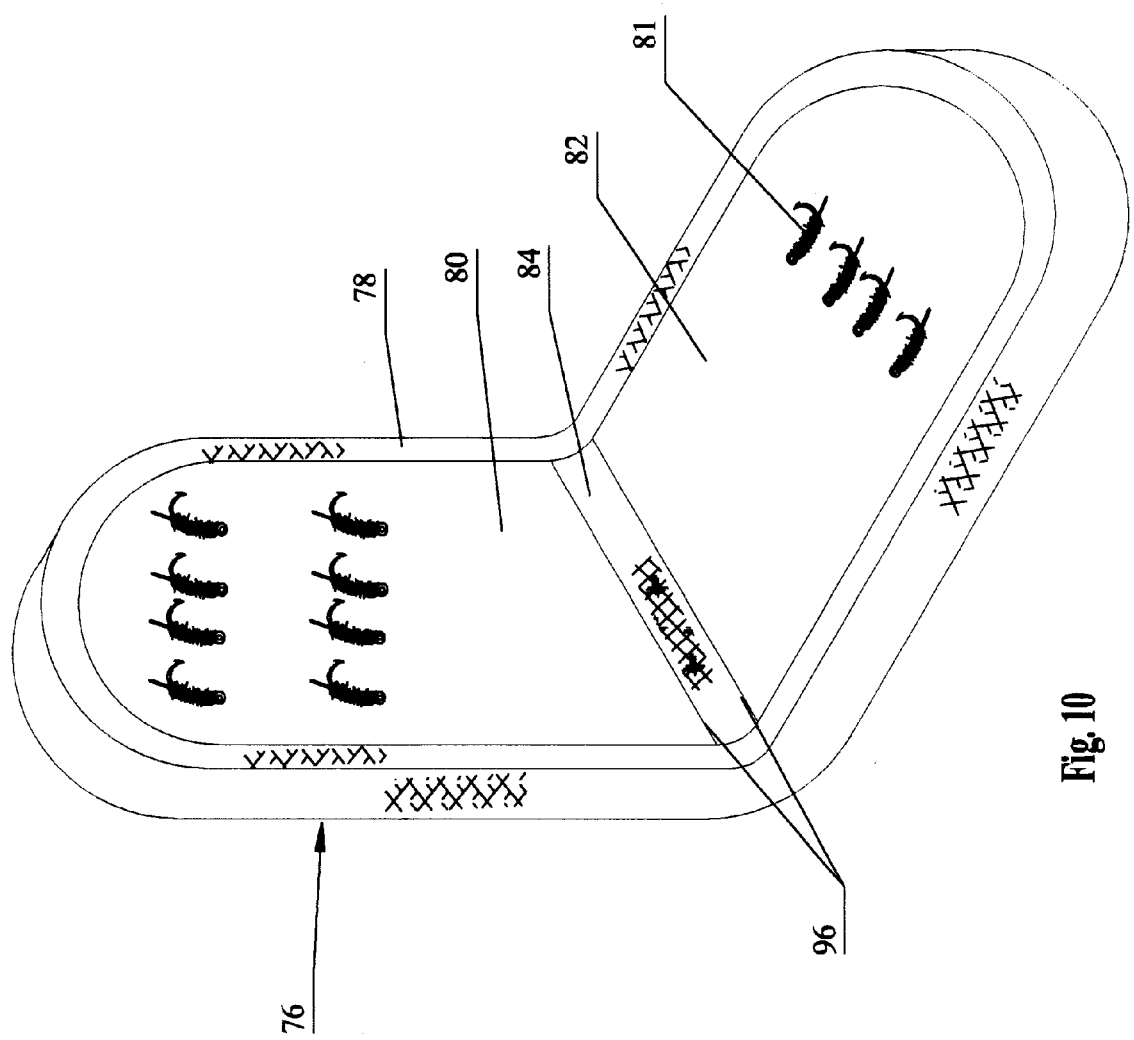
FIG. 10 is an isometric view of the foam insert.
Figure 10A:
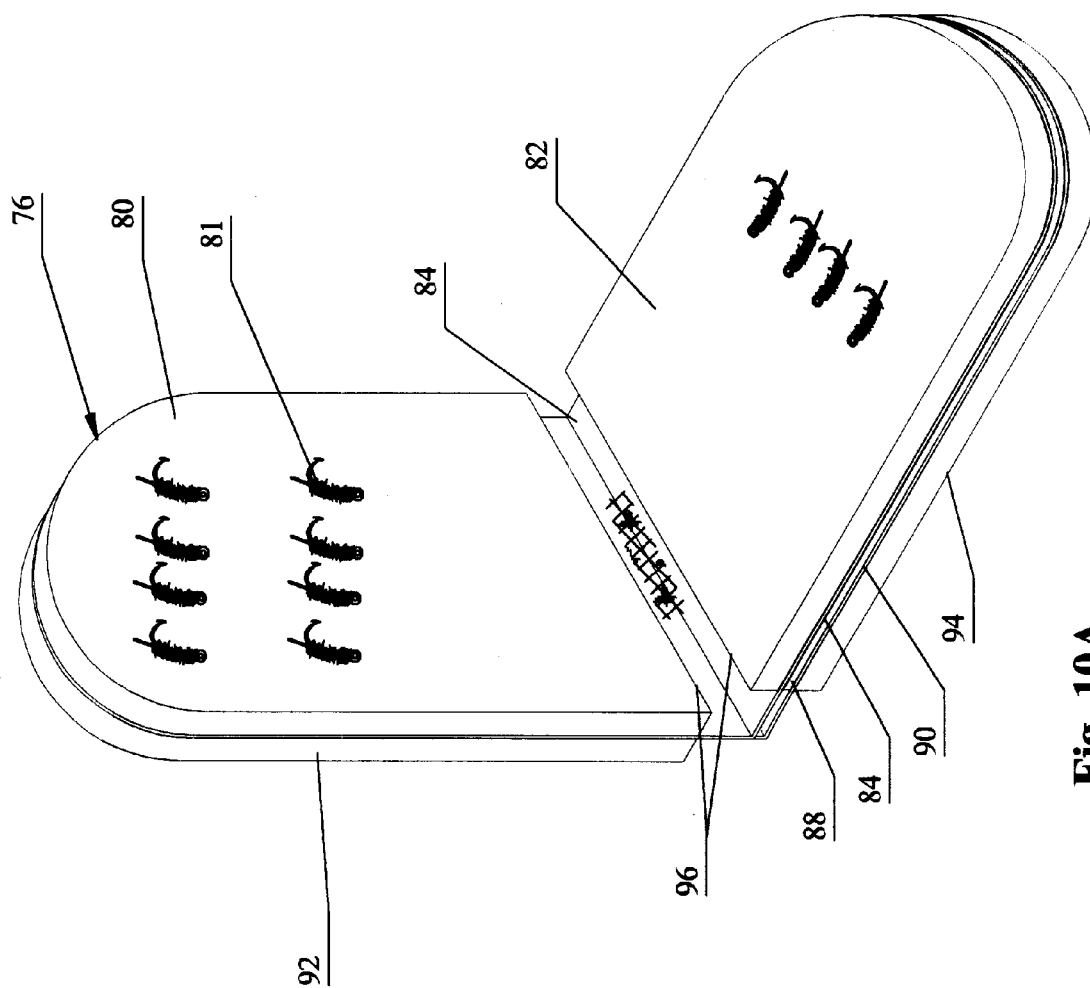
FIG. 10A is an isometric view of the foam insert without the edging strip.

The final assembly of the foam insert 76 is shown in FIG. 10 and 14. The outer composites of the foam inserts 76 are detailed in FIG. 10A and 10B. The foam inserts 76 are constructed so that additional storage pockets 96 are formed at the short straight end edges of the foam rubber section 80, 82, 92, 94 respectively above the fabric panel 84 and fabric panel 90. A utility of the foam insert 76 is for the storage of flies 81 as shown in FIG. 10. A edging strip 78 surrounds the layered materials of the foam insert 76. The detail of the layered materials and construction of the foam insert 76 is shown in FIG. 11 as an exploded isometric view. As shown in FIG. 11, four sections of thin foam rubber 80, 82, 92, 94 respectively, formed of a flexible foam rubber flexible material, are sized and cut to the same dimensions to form the top surface layer of the foam insert 76. Two fabric panels 84 and 90 respectively are sized and cut to the same dimensions to form the layers which are attached underneath the foam rubbers 80, 82, 92, 94 respectively.

The fabric panels 84 and 90 are formed from a soft, flexible nylon material. Two plastic sheets 86 and 88 are sized to the same dimensions to form the middle layer of the foam insert 76 and sandwiched between the fabric panel 84 and the fabric panel 90. The two plastic sheets 86 and 88 are formed of a thin flexible plastic material. The sizes and dimensions of the foam rubber 80, 82, 92, 94 and the plastic sheets 88 and 86 are similar, the widths being approximately one half inch less than the widths of the end section 48 and end section 44, and at least one and one half inch in total length less than the total combined length of the end section 44 and end section 48. The radius of the curved ends of the foam rubber 80, 82, 92, 94 and the plastic sheets 88 and 86 are proportional to the widths, and approximately one and one half inches in radial length. The sizes and dimensions of the foam insert 76 can be changed but must adaptable to coincide with the dimensions of the outer shell 32. The fabric panels 90 and 84 are approximately one inch longer in length than the lengths of the sections of foam rubber 82 and foam rubber 80 when the sections of foam rubber 82 and foam rubber 80 are placed with their bottom straight end edges adjoined.

Figure 10B:
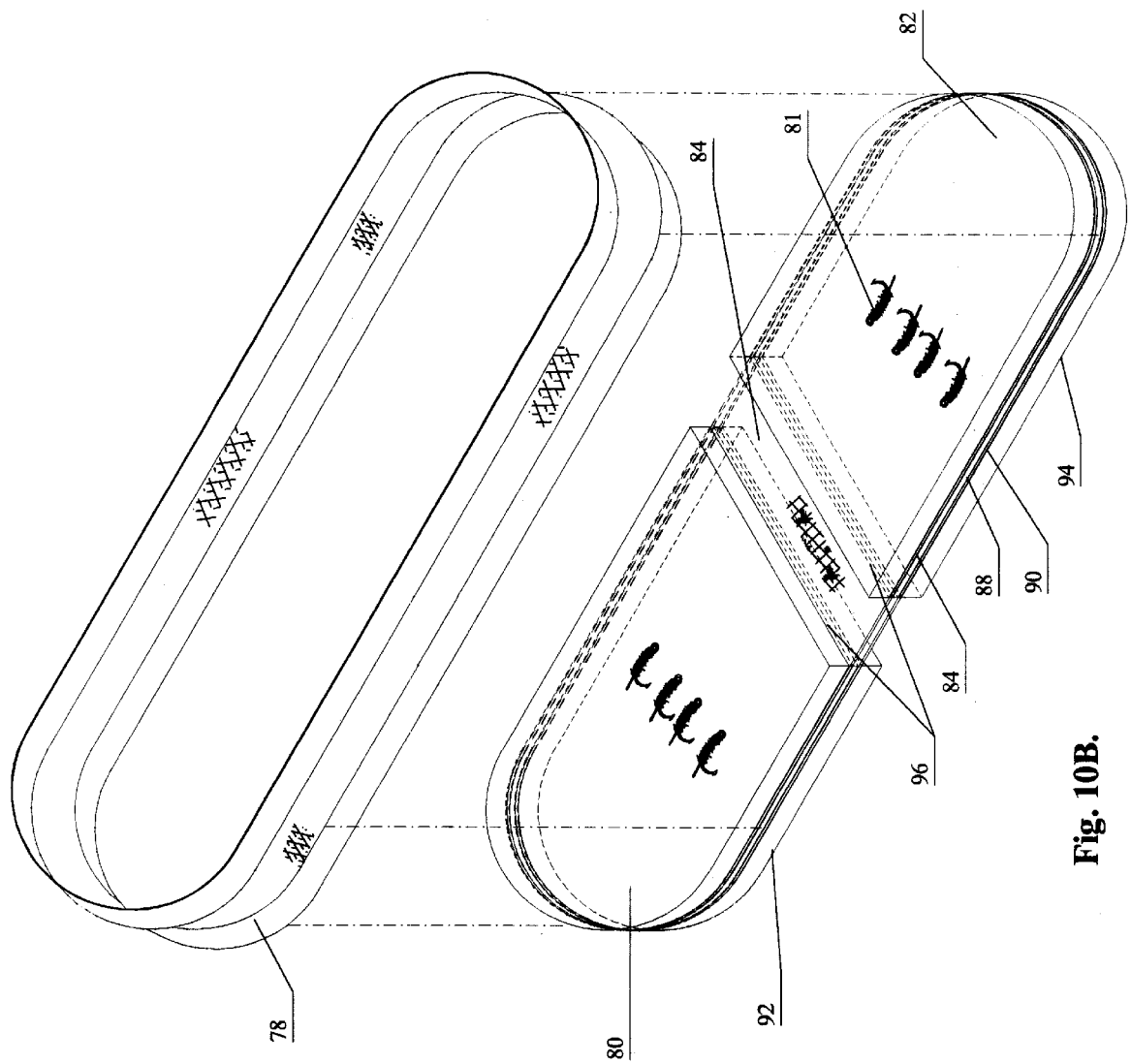
FIG. 10B is an isometric flat view of the foam insert without the edging strip.

The assembly of the foam insert 76 is done such that the plastic sheets 86 and 88 are sandwiched in between the interior walls of the fabric panels 84 and 90 with the top curved end edges of the plastic sheets 86 and 88 and the fabric panels 84 and 90 aligned. The sections of foam rubber 80 and foam rubber 82 are placed on top of the fabric panel 84 by aligning the curved end edges and creating a separation between the straight end edges of the foam rubber sections 80 and 82. The sections of foam rubber 92 and foam rubber 94 are placed on bottom of the fabric panel 90 by aligning the curved end edges and creating a separation between the straight end edges of the foam rubber sections 92 and 94. A edging strip 78 placed around and secured with thread on the top outside faces of the foam rubber 80, 82, 92 and 94 respectively to secure the assembly of the foam insert 76 as shown in FIG. 10B.

The final assembly of the elastic insert 68 is shown in FIG. 12 and 15. The outer composites of the elastic inserts 68 are detailed in FIG. 13. A utility of the elastic insert 68 is to secure and store ammunition 71 as shown in FIG. 12, 13, and 15.

The detail of the composite materials and construction of the elastic insert 68 is shown in FIG. 13 as an exploded isometric view. As shown in FIG. 13, Two fabric panels 72 are sized and cut to the same dimensions to form the surface layers of the elastic inserts 68. The fabric panels 72 are formed from a soft, flexible nylon material. Two plastic sheets 74 and 75 are cut to the same dimensions to form the middle layer of the elastic insert 68. The two plastic sheets 74 and 75 are formed of a thin, flexible plastic material. The dimensions of the plastic sheets 74 and 75 are similar, the widths being approximately one half inch less than the widths of the end section 48 and end section 44, and at least one and one half inch in total length less than the total combined length of the end section 44 and end section 48. The radius of the curved ends of the plastic sheets 74 and 75 are proportional to the widths, and approximately one and one half inches in radial length. The sizes and dimensions of the elastic insert 68 can be changed but must adaptable to coincide with the dimensions of the outer shell 32. The fabric panels 72 are approximately one inch longer in length than the lengths of the plastic sheets 74 and 75 when the plastic sheets 74 and 75 are placed with their bottom straight end edges adjoined. The assembly of 68 is done such that the plastic sheets 74 and 75 are placed in between the walls of the fabric panels 72 with the top curved lengths of the plastic sheets 74 and 75 and the fabric panels 72 being aligned. A seam around the perimeter of the fabric panels 72 secures this base. Attached onto of the fabric panels 72 are a plurality of elastic strips 70. Four elastic strips 70 are placed on the topside and the bottom side of the outer walls of the elastic insert 68. The elastic strips 70 are attached by sewing transversely across the elastic strips 70 to create storage spaces for ammunition 71 as shown in FIG. 12 and 13.

Turning now to FIG. 16 where the sports bag 19 has been configured to attach to a float tube 98. Turning now to FIG. 17, where the soft-sided sports bag has been configured to carry a water bottle in the outer tote bag, while using it for carrying ammunition.

Thus it can be appreciated that the described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood by that foregoing and other modifications are exemplary only, and that equivalent changes in form and detail may be made with out departing from the true spirit and scope of the invention as claimed, except as precluded by the prior art.

Advantages

From the description above, a number of advantages of my soft-sided sports bag with removable, replaceable foam and elastic inserts become evident and identified as follows. For fly-fishermen the use of the soft-sided sports bag along with the foam inserts will no longer have to carry numerous fly boxes or rely on a fishing vest to carry the fly boxes in. The soft-sided sports bag with the foam insert will enable the fly fisherman to carry a large assortment of flies as well as fishing tackle and accessories.

For the fly-fishermen fast and easy accessibility to fishing tools, accessories and flies is important. Because the soft-sided sports bag is closed with a heavy duty zipper, and provides elastic straps, a zipper pouch, a internal pocket system, and removable foam inserts inside the soft case, the fly fishermen can easily access those items needed to fish. In addition to the easily accessible internal storage compartments and devices, a outer tote bag is provided outside of the soft-sided sports bag. The outer tote bag is sized to accommodate items such as an extra fishing spool, sunglasses, a water bottle, and even jars for fish bait. In addition to the extra storage provided by the outer tote bag, there are several elastic strips are provided exterior to the soft-sided sports bag for placement and storage of small accessories and fishing tools. The placement of these small elastic strips makes access to fishing tools easy. A belt strap and attachment loop is provided exterior of the sports bag on the opposite side of the outer tote bag to allow the soft-sided sports bag to be attached to other items using readily available straps and buckles. With the use of the belt strap and attachment loop, the soft-sided sports bag can easily be tied onto a float tube. Of course, with the belt provided the soft-sided sports bag can easily be buckled and attached to shoulder straps of chest waders, loops of pants, belts, or anything that the belt can be wrapped around for carrying. The inside of the soft-sided sports bag has a netted zippered pouch, which makes it easy to store and locate fishing tools and accessories.

Of course for the hunter the soft-sided sports bag offers some advantages as well. Besides making available numerous pockets, elastic strips, and the outer tote bag all of which can be used to carry a variety of hunting items such as binoculars, a water bottle, lighters, matches, a compass, first aid accessories, snacks, and ammunition using the elastic inserts.

The soft-sided sports bag is formed from lightweight materials and fabrics, which are readily available, and can be assembled by a person who is skilled in the trade of sewing, in a variety of colors.

The inserts used with the soft-sided sports bag can be easily removed for replacement, or to provide extra storage. Shown in this application are two types of inserts, the foam insert, and the elastic insert. For the fly fisherman, who enjoys the art of tying his own flies, he can remove the foam insert, place at the location he is tying flies, attach the flies directly to the foam insert, and simply place it back into the sports bag when he is ready to leave with his large assortment of flies. The wide space afforded by the sports bag will enable the fly fisherman to insert up to as many as three foam inserts into the sports bag. This is comparable to carrying six large fly storage boxes. For the hunter, the sports bag with use of the elastic insert can easily accommodate a box of ammunition. The use of the soft-sided sports bag can eliminate the need to carry sports vest, which are typically worn by fly-fishermen, hunters, and photographers.

Operation—FIGS. 1, 14, 15, 16, 17

The manner of using the soft-sided sports bag for outdoor activities is provided below for fly-fishing and hunting. Using the belt 38, the soft-sided sports bag 19 can be strapped around a variety of items such as shoulder straps on waders, belt loops on pants, a belt, and other items. By using the belt 38, the soft-sided sports bag can easily be carried off the hip. The outer tote bag 20 provides extra storage space of different sports items such as an extra fly fishing spool, fishing bait, fishing equipment and tools, hunting accessories, binoculars, and will even accommodate a water bottle. The drawstrings 26 with the use of a drawstring barrel 24 can be used to close and secure items within the outer tote bag 20. A heavy-duty open-ended zipper 36 is provided to operable open and close the soft-sided sports bag 19 and secure stored items. Several elastic strips 30 are placed on the exterior face of the zipper panel 34. The elastic strips 30 allow for easy storage of small tools and accessories. Two small storage pockets 28 are also provided on the exterior of the outer tote bag 20 to carry small items. The belt strap 40 and attachment loop 42 allow the sports bag 19 to be attached to bulky items using either a belt, snap hook, or other attaching mechanisms. Inside the sports bag 19 is a strap 58. The foam inserts 68 and/or elastic inserts 76 can be slipped underneath the strap 58 and secured by the strap 58. Up to three foam inserts 68 and/or three elastic inserts 76 can be carried and enclosed within the soft-sided sports bag 19 at one time. Attached to the face of the foam insert 76 can be flies 81 or fishing lures as shown in FIG. 14. The elastic insert 68 can be used to carry ammunition 71 as shown in FIG. 15, by sliding the ammunition 71 underneath the elastic strips 70. A system of pockets 54 is provided interior to the soft-sided sports bag 19 to allow for easy storage of tools and accessories. A leader spool 52 is shown as inserted in the pocket system 54 in FIG. 4. Additionally, an internal net pouch 55 with a zipper 53 is provided to enclose and store tools and accessories.

CONCLUSION, RAMIFICATIONS, AND SCOPE

Accordingly, the reader will see that the soft-sided sports bag of this invention can be used to accommodate those needs of having a convenient compact, light weight method to carry tools, accessories, and equipment used by fishermen, hunters and other outdoor sports enthusiasts. The soft-sided sports bag with use of the removable, replaceable, and interchangeable inserts replaces the use of traditional fishing and hunting vests, and carrying cases and boxes which are used by sports enthusiasts. The use of the foam inserts for the attachment of flies and fishing lures can eliminate the need to carry multiple fly fishing boxes and cases, as it does not rely on the need to use the traditional fly fishing boxes or containers. A belt strap and attachment loop is provided so that the soft-sided sports bag can easily be tied onto bulky items such as a float tube. Of course, with the belt provided the soft-sided sports bag can easily be buckled and attached to shoulder straps of chest waders, loops of pants, belts, or anything that the belt can be wrapped around for carrying. Of course for the hunter the soft-sided sports bag offers some advantages as well. Besides making available numerous pockets, elastic strips, and the tote bag all of which can be used to carry a variety of hunting items such as binoculars, water bottles, lighters, matches, a compass, first aid accessories, snacks, and ammunition using the elastic inserts. Additional it provides a secure manner in which ammunition can be stored and carried to and from the hunting field.

The soft-sided sports bag is formed from lightweight materials and fabrics, which are readily available, and can be assembled by a person who is skilled in the trade of sewing, in a variety of colors.

Although the description above contains many specificities, these should not be construed as limiting the scope of the invention but as merely providing illustrations of some of the presently preferred embodiments of this invention. For example, the outer shell and inserts can have other shapes, such as rectangular, square, oval, triangular, trapezoidal, etc.; the belt can be made with velcro strips or button snaps, etc.; the edging strip around the foam inserts can be made of a flexible plastic material, or rubber; the foam rubber on the foam inserts can be glued to attach it to the fabric panel; the strap located interior can be of a different material composite; and in general the materials specified and be substituted for by other materials fabrics. Thus the scope of the invention should be determined by the appended claims and their legal equivalents, rather than by the examples given.

Having described fully the preferred embodiments of the principle relating to the subject matter, including the method of construction considered to be the best, it is emphasized that the foregoing may not be construed as restrictive in any sense of the rights and privileges granted by letters patent of the United States, for which I hereby claim the following:

I claim:

1. A soft-sided sports bag for fishing, hunting, hiking, and photography tools, equipment, lures and flies, comprising:
   a) a main elongated oval outer shell fabricated from flexible fabric joined along the end edges to corresponding end-edge portions of a zipper panel including a zipper bisecting the long dimensions of the said zipper panel fabricated from flexible woven nylon fabric;
   b) a elongated oval inner wall fabricated from flexible woven fabric joined along the end edges to corresponding inner end-edge portions of the said main elongated oval outer shell and the said zipper panel;
   c) a mid-layer of three flexible plastic sheets sandwiched between the said main elongated oval outer shell and the said elongated oval inner wall, whereby two of the flexible plastic sheets are similar in dimension forming the bottom side and top side of the said soft-sided sports bag, the third flexible plastic sheet is significantly rectangular in dimension forming the spine of the soft-sided sports bag;
   d) a first auxiliary receptacle formed from flexible netting fabric mounted within said main elongated oval outer shell onto said elongated oval inner wall and adapted to provide the first auxiliary receptacle within which fishing, hunting, hiking, photography tools, accessories and equipment may be enclosed;
   e) a second auxiliary receptacle formed from flexible woven material mounted within the said main elongated oval shell and onto the said elongated oval inner wall and adapted to provide the second receptacle within which fishing, hunting, hiking, photography tools, accessories and equipment may be enclosed;

f) a third auxiliary receptacle formed from flexible strong woven material holding strip positioned across and overlaying the said elongated oval inner wall and at the middle of the overall length of the said elongated oval inner wall the with ends sandwiched and attached between the said elongated oval inner wall and the said elongated oval outer shell and adapted to provide the third auxiliary receptacle for securing more than one removable interchangeable inserts;

g) a fourth auxiliary receptacle formed from flexible woven fabric positioned to the side of the said first auxiliary receptacle and mounted to the exterior the said soft-sided sports bag onto the said main elongated and sewn down the near long end-edge portion, across the formed enclosed bottom end-edge portion and up the opposite long end-edge portion, with the near long end-edge portion, the bottom end-edge portion and the opposite long end-edge portion sandwiched in between the said main oval outer shell and the said elongated oval inner wall, and adapted to provide the fourth auxiliary receptacle within which fishing, hunting, photography, hiking, tools, accessories, equipment, fishing reels, spools, water bottle, fishing bait, compact binoculars, and snacks may be enclosed;

h) a fifth auxiliary receptacle formed of flexible woven elastic fabric strip are mounted in sets of two on the near side and the opposite side of the side soft-sided sports bag onto the said zipper panel with the open ends facing the direction to and opposite of the said spine, such that both parallel end-edges of the said fabric strips are parallel to the end-edge of the said main outer shell are secured to form a slip through attachment device adapted to provide the fifth auxiliary receptacle for securing items, tools and accessories used for fishing, fly-fishing, hunting, hiking, and photography under the set of said strips exterior to the said soft-sided sports bag;

i) a sixth auxiliary receptacle formed of flexible woven elastic fabric strip mounted onto the interior of the said elongated oval inner wall with the end-edges of the said fabric strips which are parallel to the bottom end-edge of the said first auxiliary receptacle sewn and the other two ends of the said fabric strip left open and facing towards the outer end edges of the said elongated oval inner wall to form a slip through attachment device adapted to provide the sixth auxiliary receptacle for securing items, tools and accessories used for fishing, fly-fishing, hunting, hiking, and photography interior to the said soft-sided sports bag;

j) a seventh auxiliary receptacle formed of a strong flexible woven material strip with the mid section sewn to the underside and exterior of the said elongated outer shell and the end-edges of the said material strip is positioned parallel to the straight end-edge of the said elongated outer shell with one lose end extending though and secured around a female belt snap fastener and the second lose end extending through and secured around a male belt snap fastener to provide for the seventh auxiliary receptacle which is adapted to secure the soft-sided sports bag around outer-sportswear, sports equipment, backpacks, belt loops, and shoulder straps;

k) a eighth auxiliary receptacle formed of a strong flexible woven material strip and unfastened loop formed of plastic which is slid onto the said material strip whereby the said material strip extends across the width and onto exterior wall of the said elongated outer shell and orientated perpendicular to the said seventh auxiliary whereby the near end and the opposite end of the said material strip are sandwiched in between the said elongated outer shell and the said elongated oval inner wall at opposite ends of the soft-sided sports bag to provide for the seventh auxiliary receptacle which is adapted to secure the soft-sided sports bag around bulky sports equipment, float tubes, backpacks with the use of a narrow strong woven belt;

l) a removable foam inserts detachably secured to the interior of the said elongated oval inner shell by sliding underneath the said third auxiliary receptacle, and adapted to be enclosed within the said soft sided sports bag when closed and selectively extendable to project out when said soft sided sports bag is open, with surface walls formed of thin flexible foam rubber material, to provide for the removable foam insert which is adapted for the attachment of outdoors sports accessories, fishing lures and flies used for fishing and fly-fishing; and m) a removable elastic inserts detachably secured to the interior of the said elongated oval inner shell by sliding it underneath the said third auxiliary receptacle, and adapted to be enclosed within the said soft-sided sports bag when closed and selectively extendable to project out when the said soft-sided sports bag is open with surface walls formed of flexible woven fabric with adaptable elastic bands extended and overlaid across a surface walls, wherein the said surface walls are formed of flexible woven fabric and adapted to provide for the removable elastic insert which is adapted to secure and store ammunition, film, tools and particular outdoors sports accessories are secured for easy access.

2. The soft-sided sports bag according to claim 1, wherein said first auxiliary receptacle constitutes a pouch and a zipper is provided selectively operable to open or close the pouch.

3. The soft-sided sports bag according to claim 1, wherein the said second auxiliary receptacle constitutes a pocket system the end-edges of the said pocket system are sewn across at the end-edge of the spine across the interior width of the soft-sided sports bag to form the said pocket system, and the open end of the said pocket system is in the direction facing the curved end-edge of the soft-sided sports bag, where by the said pocket system is adapted to receive and store fishing, hiking, and photography tools and accessories interior to the soft-sided sports bag.

4. The soft-sided sports bag according to claim 1, wherein the said third auxiliary receptacle constitutes a holding strip for securing and removing more than one removable interchangeable insert, and width of said holding strip is substantially less than the width of the said spine, and the length of the said holding strip is just longer than the width of the said soft-sided sports bag, and the said holding strip is adapted to form a bridge for the said inserts to slide underneath.

5. The soft-sided sports bag according to claim 1, wherein the said fourth auxiliary receptacle constitutes a outer tote bag attached to the said main elongated oval outer shell and having an open end to open and close with a draw string, whereby the ends of the draw strings are sewn internal to the ends of a edging strip such that when the draw stings are tied with a barrel the said outer tote bag is closed, the edging strip is sewn along the end-edge to the top end-edge of the open end of said outer tote bag, and the size of the said outer tote bag is large enough to accommodate the storage of a ordinary sports water bottle.

6. The soft-sided sports bag according to claim 1 wherein the said first auxiliary receptacle includes a cover panel, formed of flexible netting fabric and superimposed over the said elongated oval inner wall, whereby a zipper is mounted on the said cover panel extending across and selectively operable to open or close giving access to the interior.

7. The soft-sided sports bag according to claim 1, wherein said second auxiliary receptacle includes a flexible woven fabric top-wall panel of which is sewn to the near and opposite end-edges of the said elongated oval inner wall and overlaying the said elongated oval inner wall adapted to form a pocket for receiving tools, equipment and accessories.

8. The soft-sided sports bag according to claim 1, wherein said second auxiliary receptacle includes a flexible woven fabric top-wall panel of which is sewn to the near and opposite end-edges of the said elongated oval inner wall and overlaying a pocket formed in claim 7 to form pocket for receiving tools, equipment and accessories.

9. The soft-sided sports bag according to claim 1, wherein said second auxiliary receptacle includes a flexible woven fabric top-wall panel of which is sewn to the near end-edge of the said elongated oval inner wall and overlaid on top of a pocket formed in claim 8 and opposite end-edge sewn to the top side of the said pocket with the stitch line formed approximately one inch inward from the opposite end edge of the said pocket for receiving tools, equipment and accessories.

10. The soft-sided sports bag according to claim 1, wherein said second auxiliary receptacle includes a top-wall panel of flexile woven fabric of which is sewn to the near and opposite end-edges of the said elongated oval inner wall to provide a plurality of evenly spaced slip pockets overlaying the formed pockets according to claim 9 for receiving tools, equipment and accessories.

11. The soft-sided sports bag according to claim 1, wherein at least one patch pocket is mounted on each side of the said outer tote bag, the said patch pocket formed of flexible woven material having an end facing in a direction parallel to the direction of the said outer tote bag.

12. The soft-sided sports bag according to claim 1, wherein a plurality of flexible woven elastic fabric strips are mounted on each side of said zipper panel and said main elongated outer shell, the said plurality of elastic woven flexile strips spaced evenly apart to secure small tools.

13. The soft-sided sports bag according to claim 1, wherein said removable foam insert is composed by a layering of materials, whereby the said layering of materials is comprised of a section of foam rubber formed of flexible thin foam rubber, a flat base sheet comprised of flexible woven fabric, a section of flexible flat thin plastic, a flat base sheet comprised of flexible woven fabric, a section of foam rubber, and the said layering of materials is secured by a edging strip formed of flexible material attached to the outer perimeter said layering and on top of the said foam rubber sections.

14. The soft-sided sports bag according to claim 1, wherein the said foam insert are comprised of two flexible flat plastic sheets and four sections of flexible foam rubber of same dimension and the total length of the two flat base sheets are approximately one inch longer than the overall length of two flexible flat plastic sheets when measured with the straight end edges abutting, whereby a pair of the said foam rubber sections are placed on each side of the flat base sheets and separated by a section of the underlying flat base sheets enabling the said foam insert to be folded at the mid-section and enabling a slip pocket underneath the short ends of the foam rubber sections, and the shape of the outer ends of the said flat base sheets and the said flexible plastic sheets and the said flexible foam rubber are of similar dimensions in width and length.

15. The soft-sided sports bag according to claim 1, wherein said removable elastic insert constitutes a flat base sheets of flexible woven fabric enclosing a pair of flexible plastic sheets of same dimension, exterior to the said flat base sheets are a plurality of elastic stretchable material strips.

16. The soft-sided sports bag according to claim 1, wherein the said removable elastic insert are formed by attaching four strips evenly spaced on each exterior surface wall of said flat base sheets across the width of the said removable elastic insert, whereby the said removable elastic inserts are adapted to be interchangeable with the said removable foam inserts to slip under and restrained by the said holding strip and enclosed within the said soft-sided sports bag.

* * * * *